United States Patent
Lee et al.

(10) Patent No.: US 10,015,824 B2
(45) Date of Patent: Jul. 3, 2018

(54) METHOD AND APPARATUS FOR TRANSMITTING UPLINK DATA HAVING LOW LATENCY IN WIRELESS COMMUNICATION SYSTEM

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/122,331

(22) PCT Filed: Nov. 17, 2014

(86) PCT No.: PCT/KR2014/011035
§ 371 (c)(1),
(2) Date: Aug. 29, 2016

(87) PCT Pub. No.: WO2015/129985
PCT Pub. Date: Sep. 3, 2015

(65) Prior Publication Data
US 2016/0366704 A1 Dec. 15, 2016

Related U.S. Application Data

(60) Provisional application No. 61/945,833, filed on Feb. 28, 2014.

(51) Int. Cl.
*H04W 74/08* (2009.01)
*H04W 72/04* (2009.01)
(Continued)

(52) U.S. Cl.
CPC ... *H04W 74/0833* (2013.01); *H04W 72/0413* (2013.01); *H04W 72/1284* (2013.01); *H04W 74/006* (2013.01)

(58) Field of Classification Search
CPC ......... H04W 72/0413; H04W 72/1284; H04W 74/006; H04W 74/0833; H04W 72/04;
(Continued)

(56) References Cited

U.S. PATENT DOCUMENTS

2009/0232076 A1 9/2009 Kuo
2011/0216722 A1* 9/2011 Yang .................... H04L 1/0041
370/329
(Continued)

FOREIGN PATENT DOCUMENTS

EP 2 448 158 A2 5/2012

*Primary Examiner* — Robert Lopata
(74) *Attorney, Agent, or Firm* — Birch, Stewart, Kolasch & Birch, LLP

(57) ABSTRACT

The present specification provides a method for transmitting uplink data (UL data) requiring a low latency in a wireless communication system. The method performed by a terminal comprises: receiving control information related to a contention-based PUSCH zone from a base station; and transmitting uplink data to the base station on the basis of the received control information. The contention-based PUSCH zone is a resource area where uplink data of the terminal can be transmitted without allocation of a UL grant from the base station. Further, in order to distinguish between kinds of specific procedures performed by the terminal, the control information includes procedure-distinguishing information allocated for each kind of the specific procedures.

14 Claims, 25 Drawing Sheets

(51) Int. Cl.
  *H04W 72/12* (2009.01)
  *H04W 74/00* (2009.01)
(58) Field of Classification Search
  CPC .... H04W 72/12; H04W 76/00; H04B 7/2121; H04B 7/2123; H04J 2203/0069; H04Q 2213/394
  USPC ........................................................ 370/329
  See application file for complete search history.

(56) References Cited

U.S. PATENT DOCUMENTS

| | | |
|---|---|---|
| 2011/0292895 A1 | 12/2011 | Wager et al. |
| 2011/0310811 A1* | 12/2011 | Yamada .............. H04W 52/146 370/329 |
| 2012/0044878 A1 | 2/2012 | Ratasuk et al. |
| 2012/0243505 A1* | 9/2012 | Lin ........................ H04L 5/0051 370/331 |
| 2013/0034071 A1 | 2/2013 | Lee et al. |
| 2014/0079002 A1* | 3/2014 | Chen .................. H04W 74/0833 370/329 |
| 2015/0222395 A1* | 8/2015 | Suzuki ................. H04L 1/1861 370/329 |
| 2015/0358124 A1* | 12/2015 | Suzuki ................. H04L 1/1861 370/329 |
| 2016/0128011 A1* | 5/2016 | Yang ................. H04W 56/0015 370/329 |
| 2016/0338112 A1* | 11/2016 | Lee ....................... H04L 5/0053 |
| 2017/0013610 A1* | 1/2017 | Lee ............................ H04L 1/00 |
| 2017/0019930 A1* | 1/2017 | Lee ................... H04W 74/0833 |
| 2017/0055294 A1* | 2/2017 | Lee ................... H04W 72/1284 |

* cited by examiner

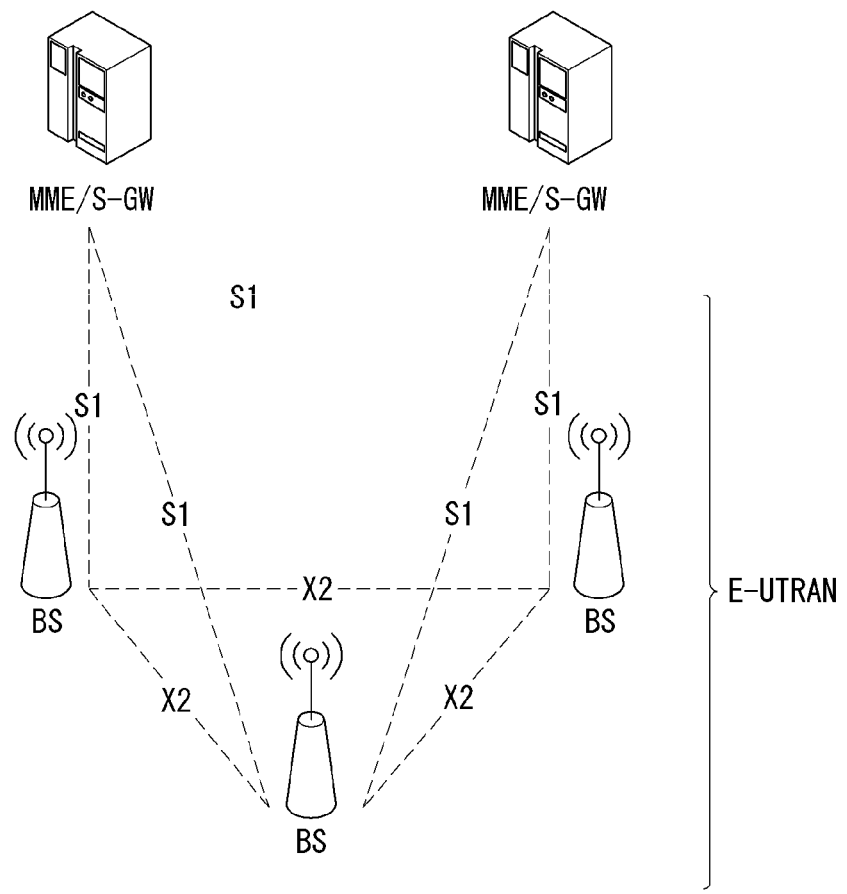
【Figure 1】

[Figure 2A]
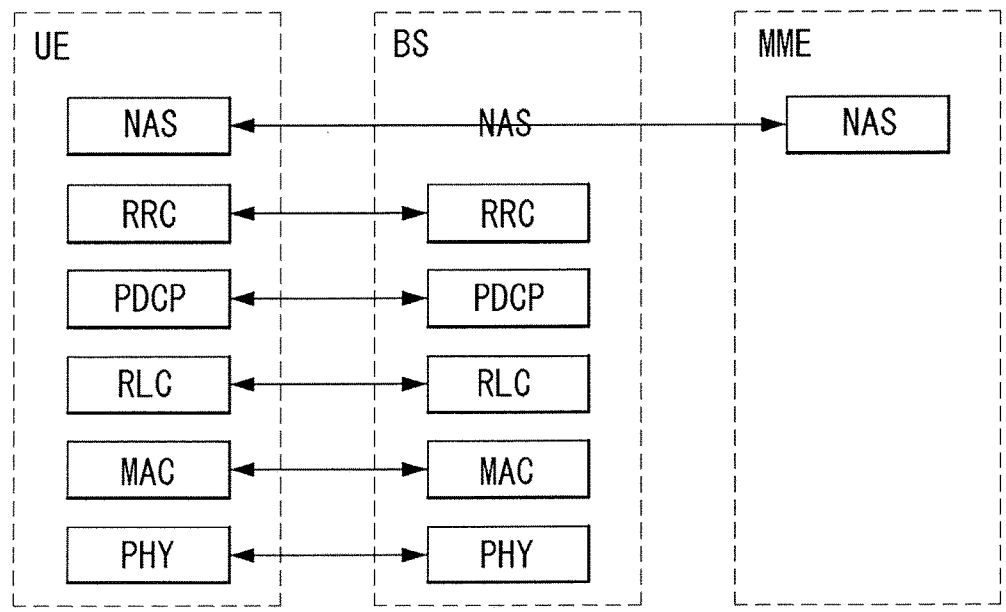
[Figure 2B]
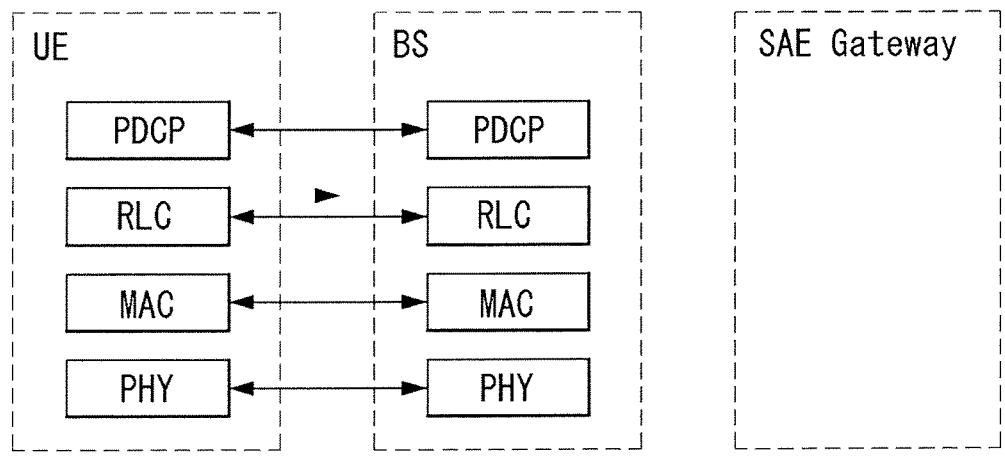

[Figure 3]
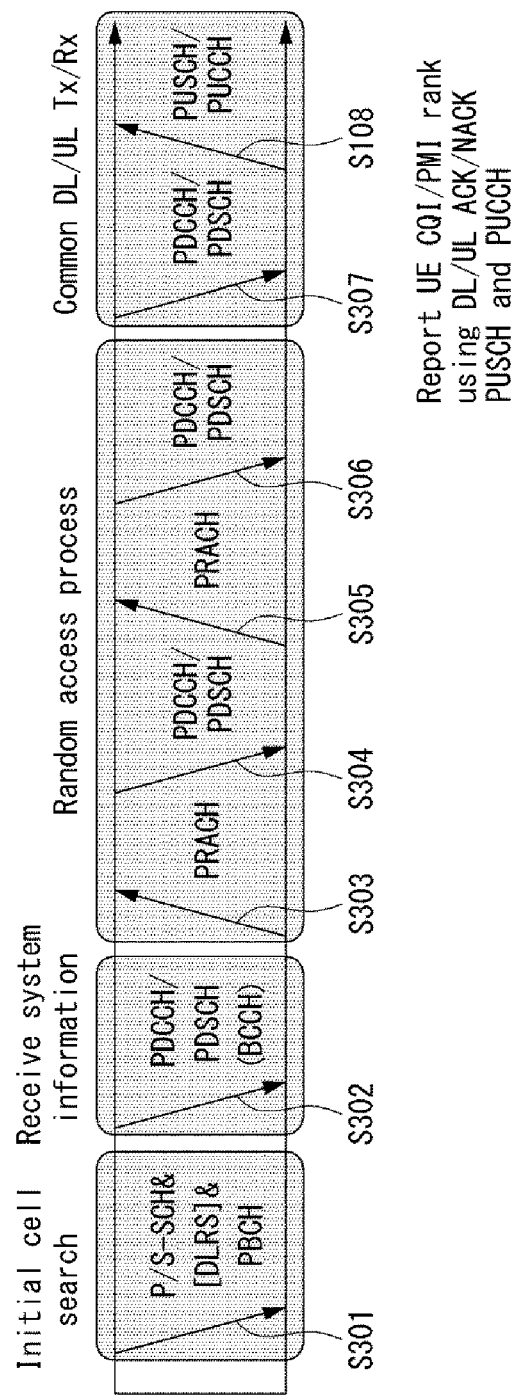

[Figure 4]
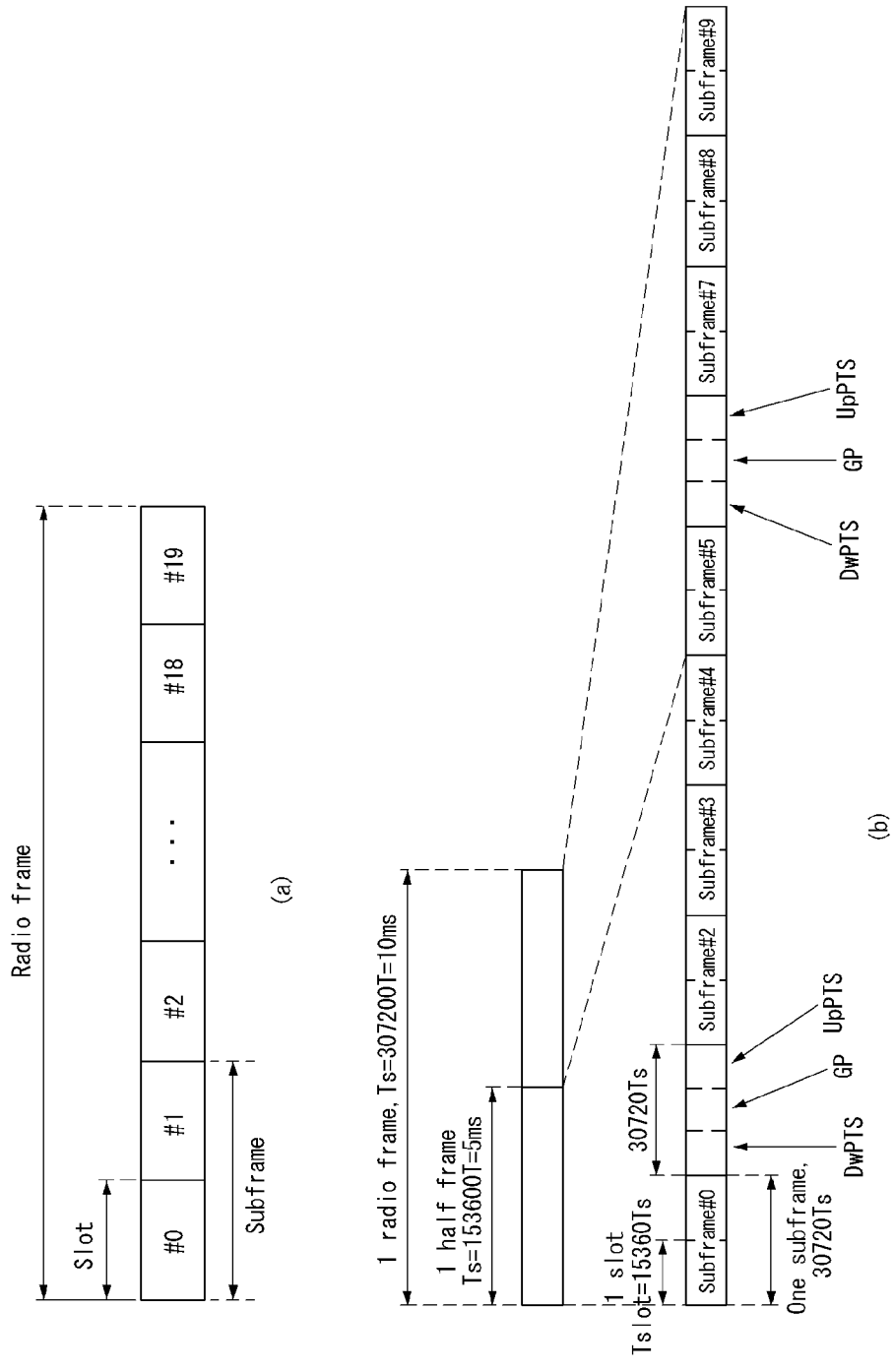

[Figure 5]
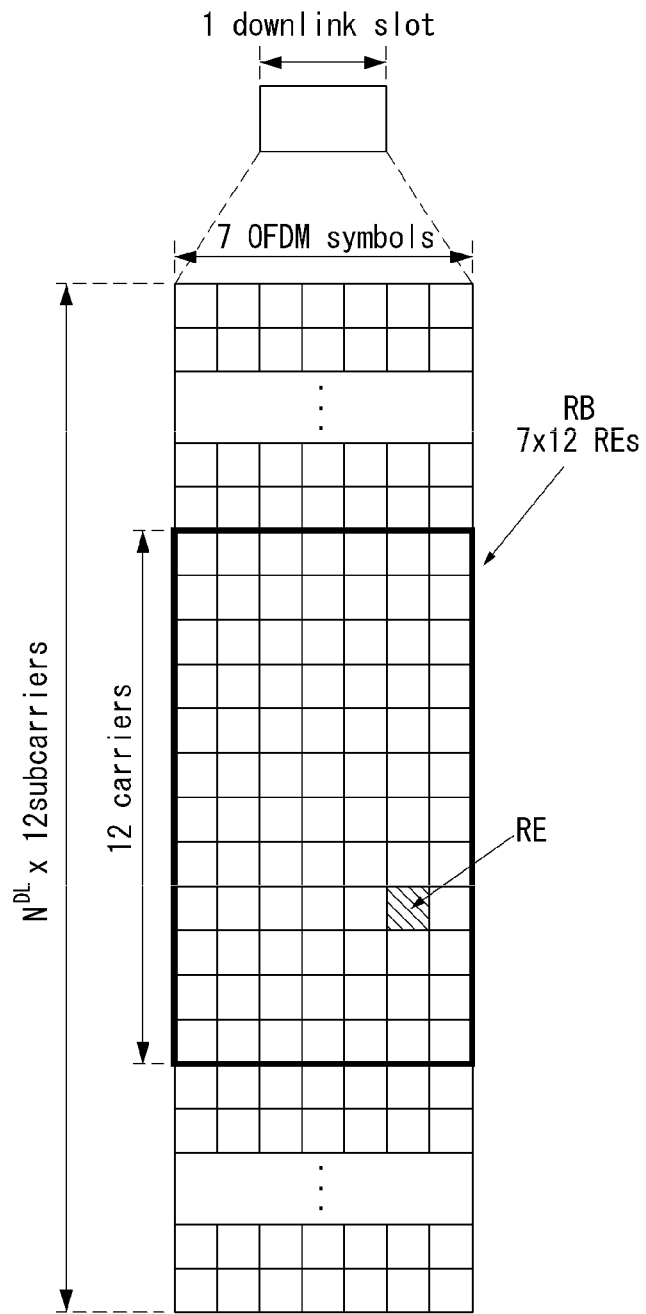

[Figure 6]
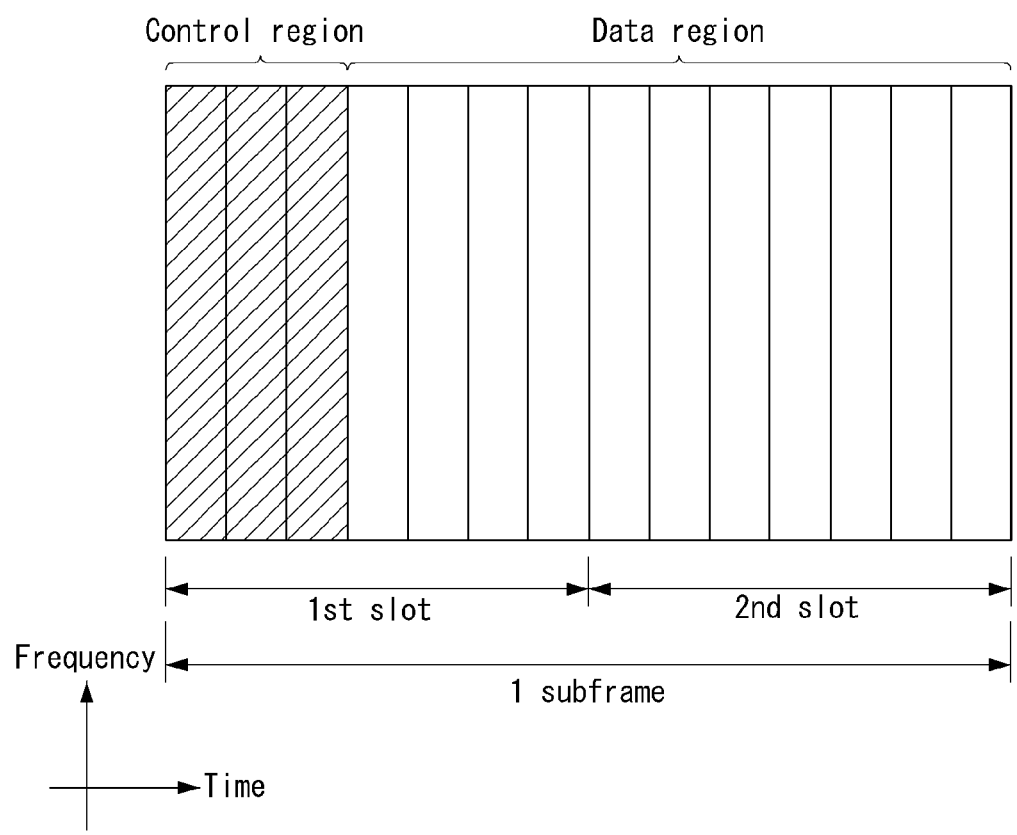

[Figure 7]
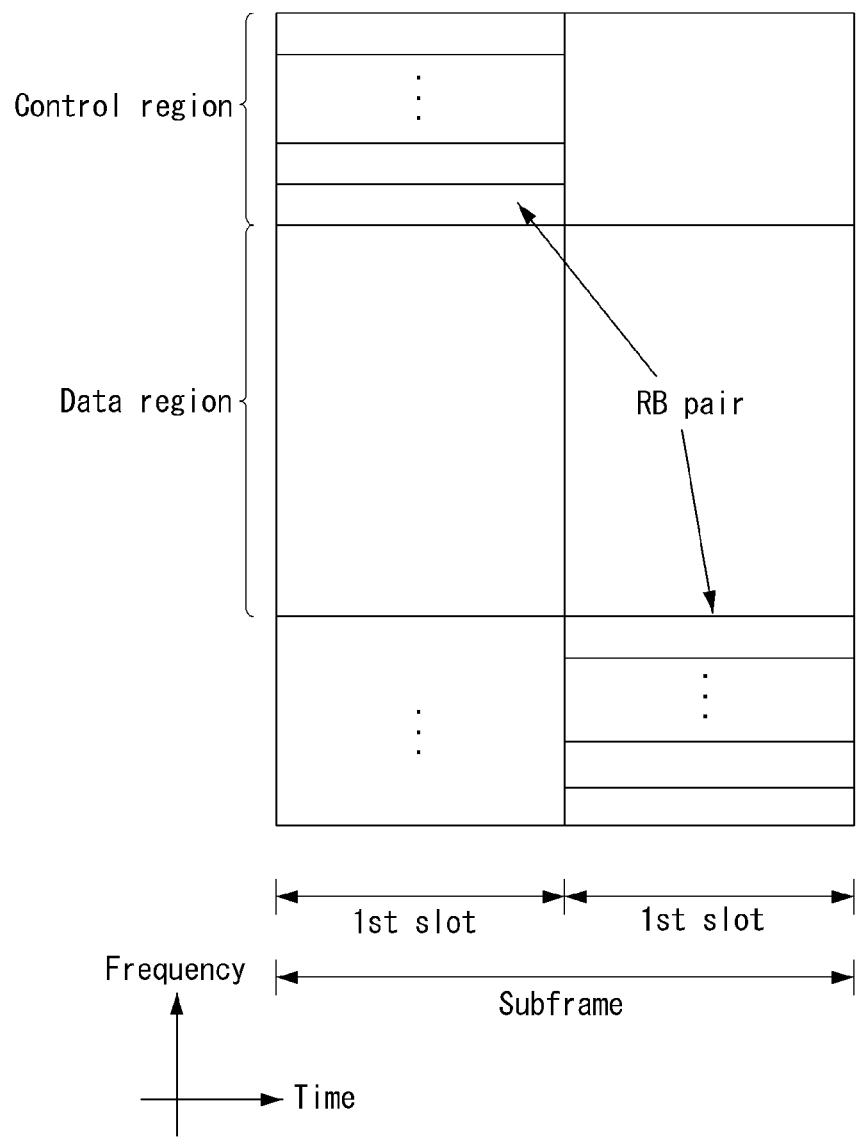

【Figure 8A】
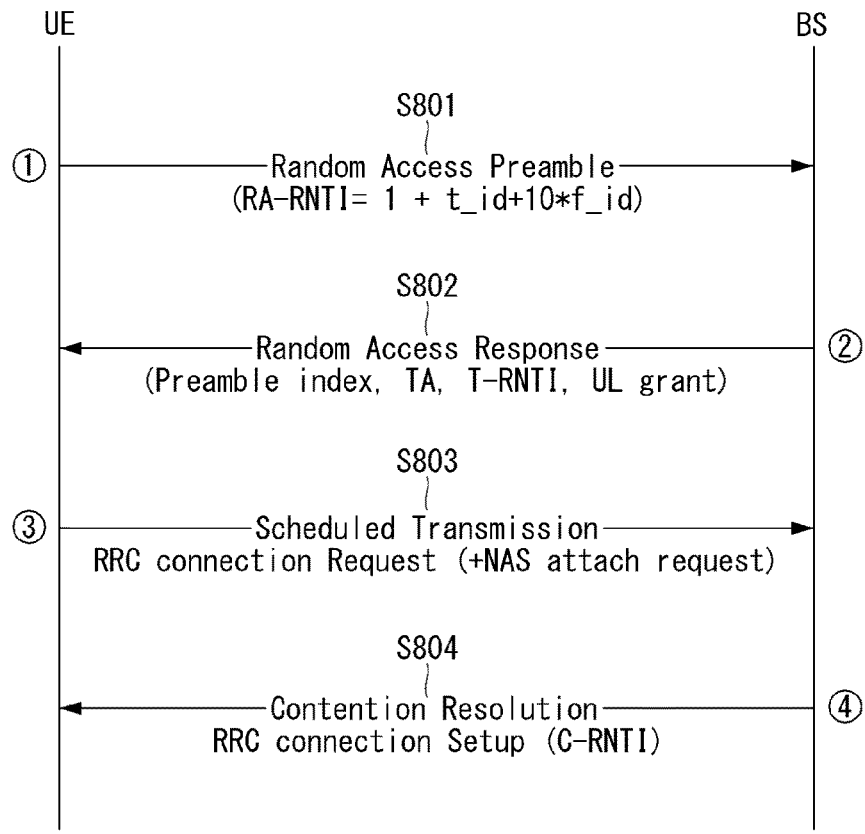
【Figure 8B】
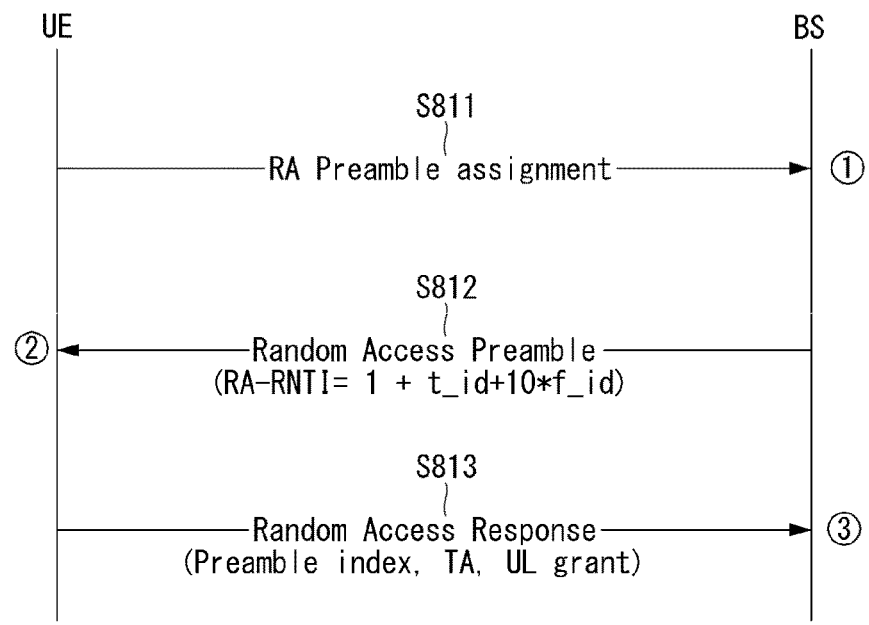

[Figure 9A]
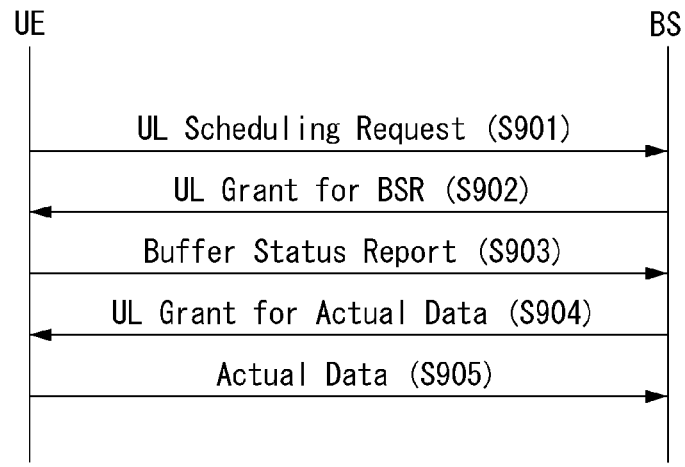
[Figure 9B]
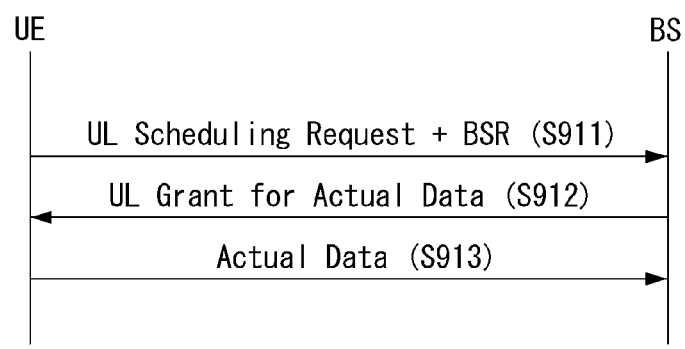

[Figure 10A]
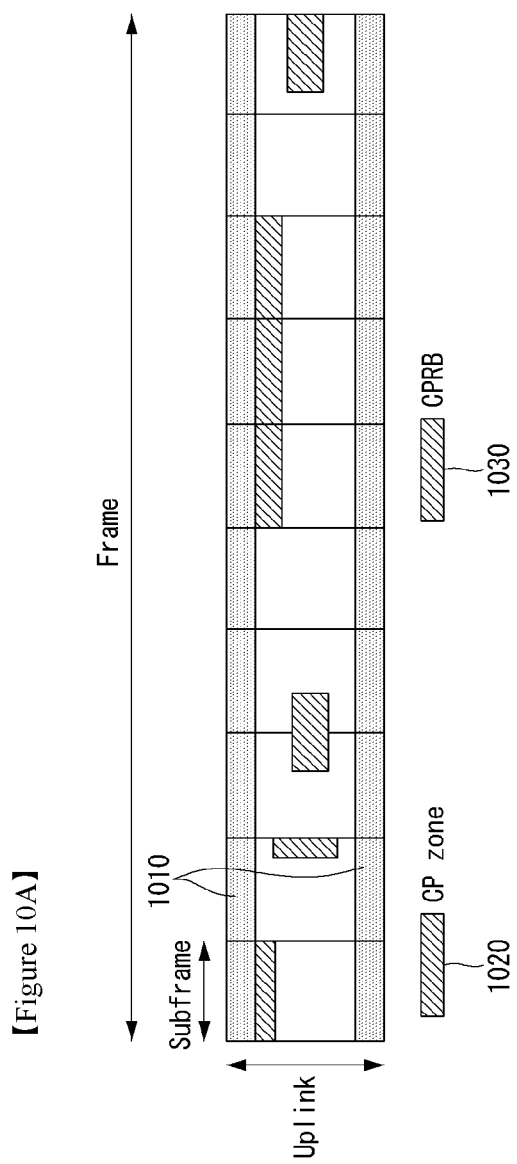
[Figure 10B]
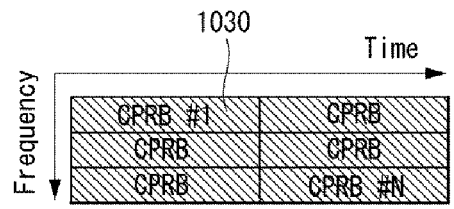

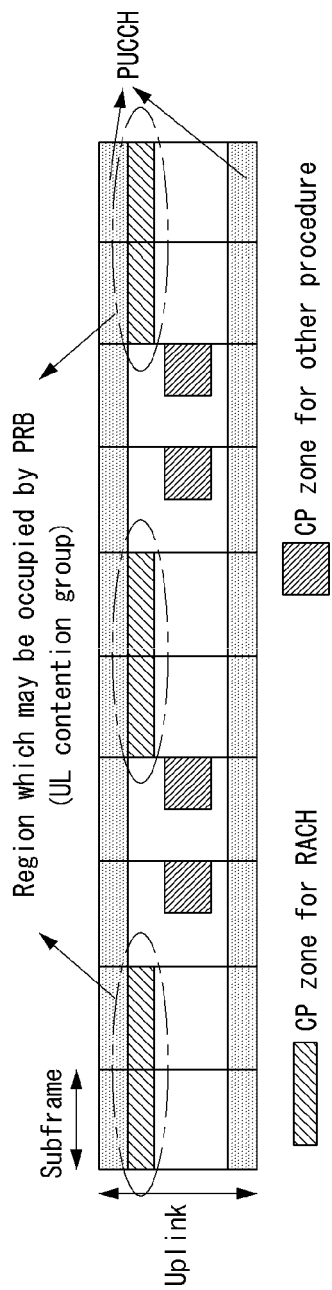
[Figure 11]

【Figure 12】
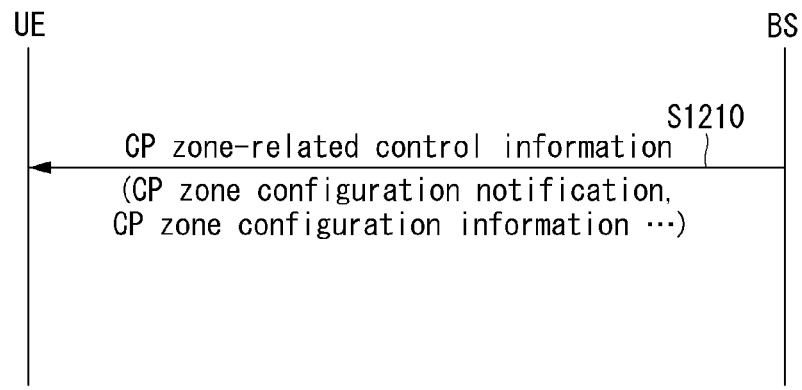
【Figure 13A】
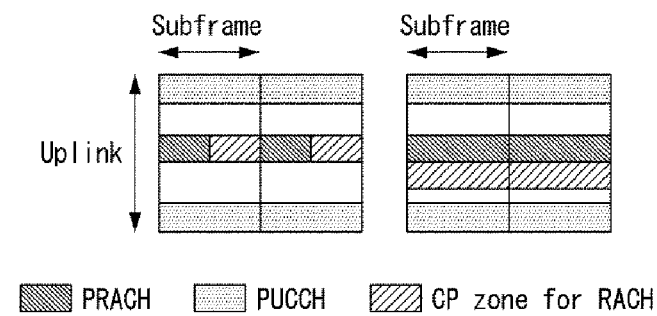
【Figure 13B】
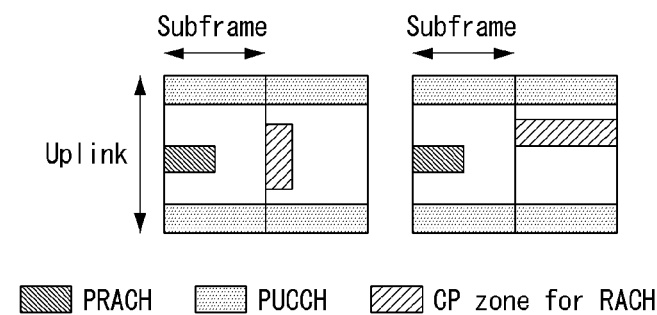

【Figure 13C】
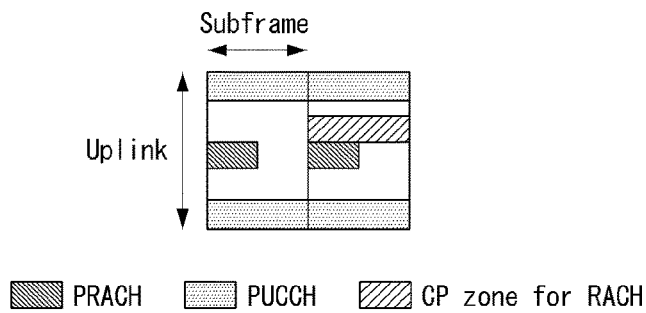
【Figure 14A】
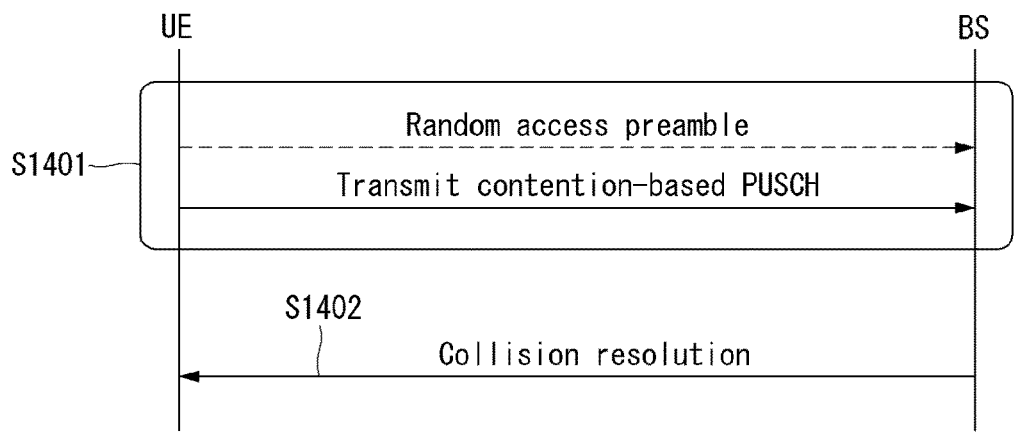
【Figure 14B】
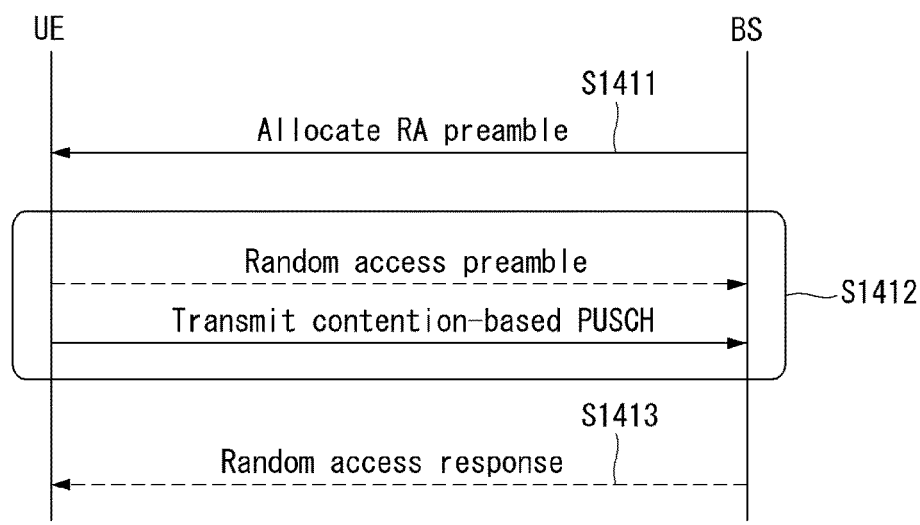

【Figure 15A】
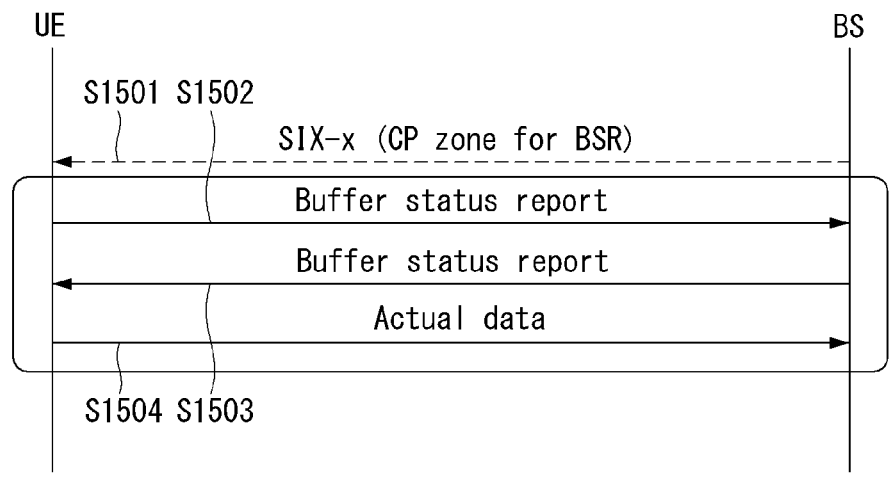
【Figure 15B】
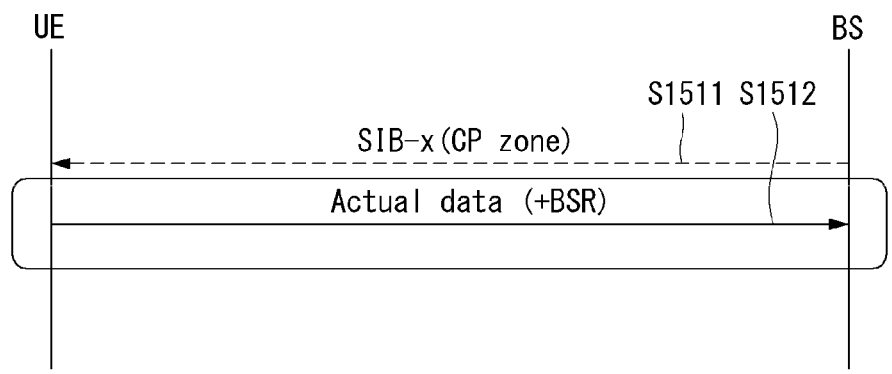

[Figure 16]
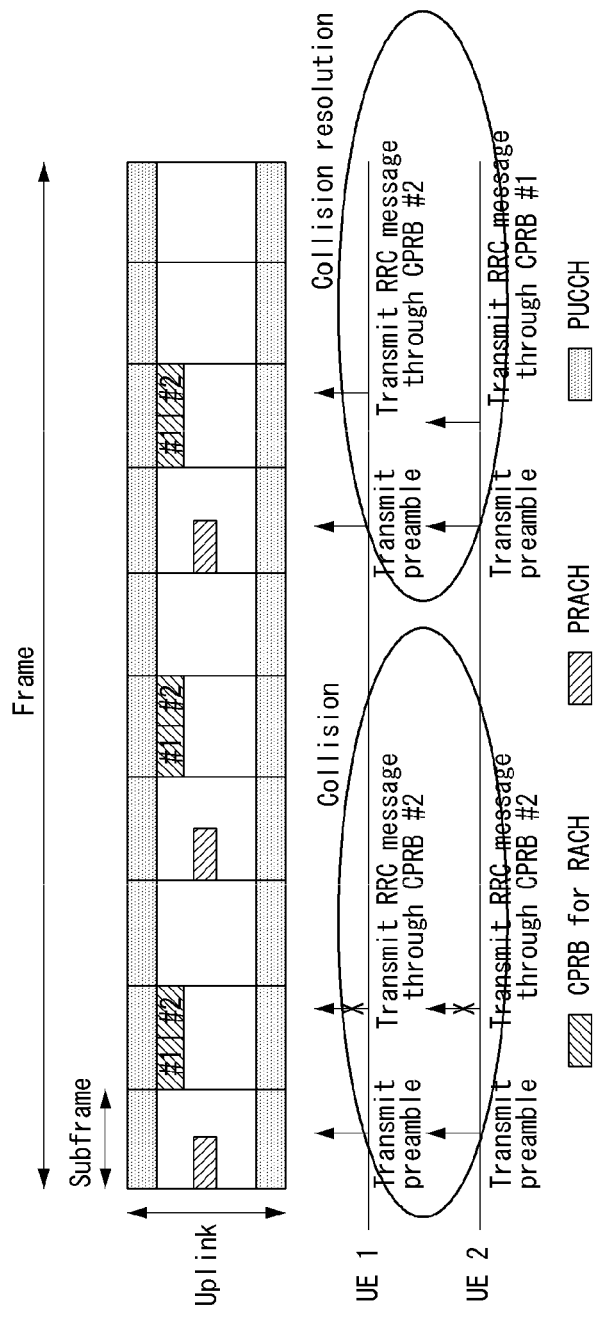

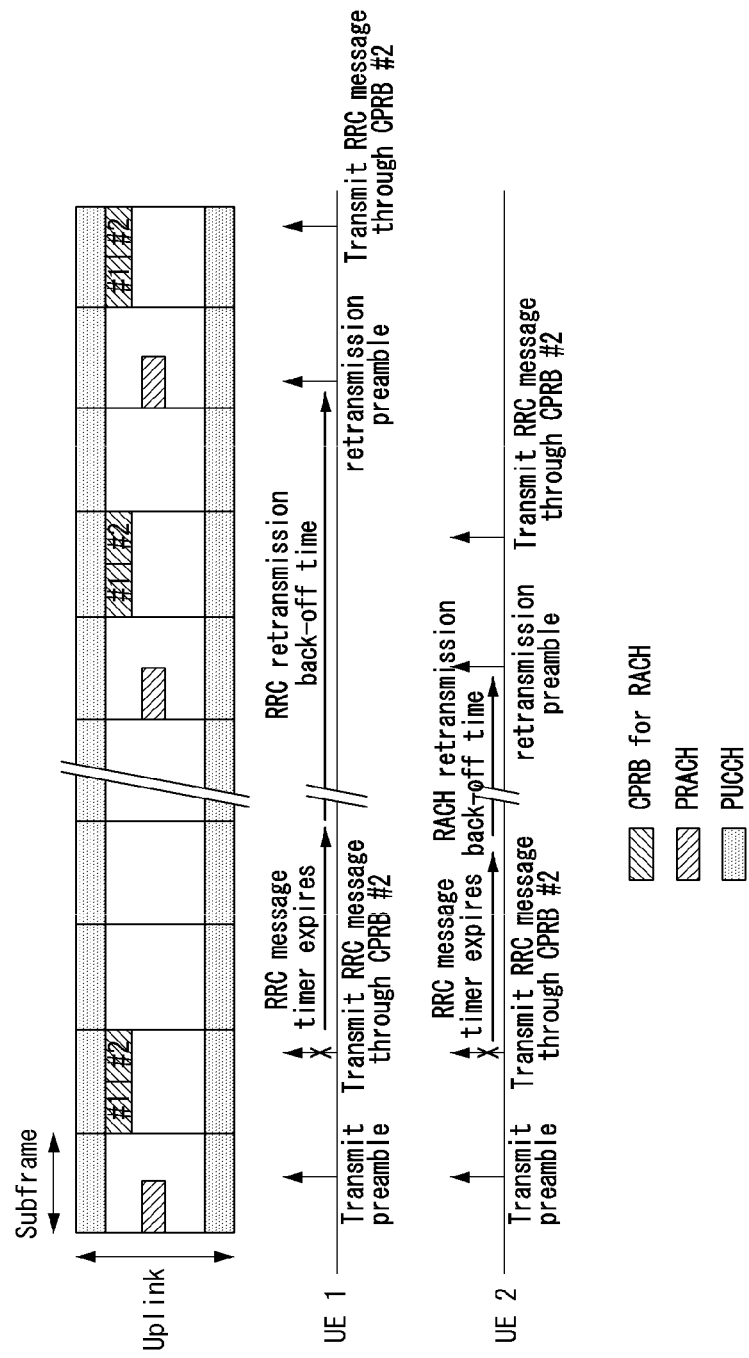
[Figure 17]

【Figure 18A】
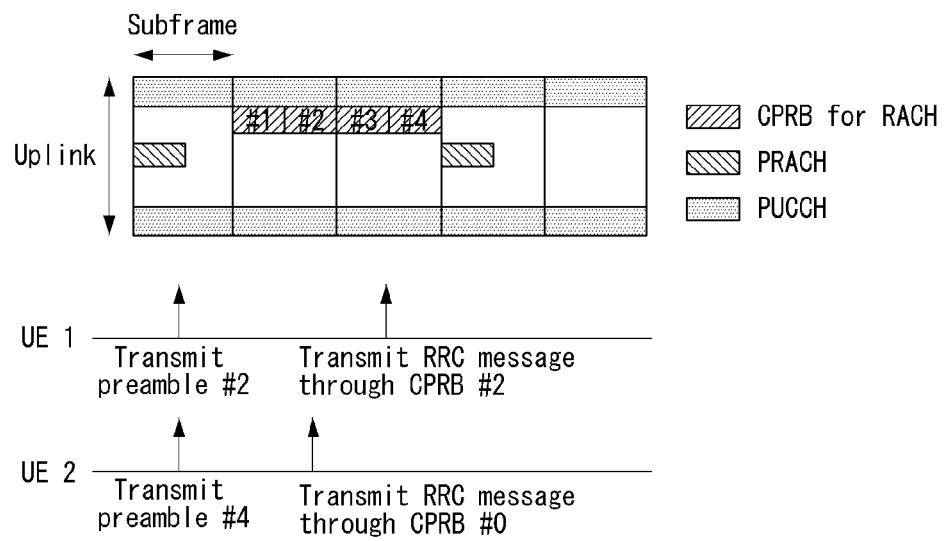
【Figure 18B】
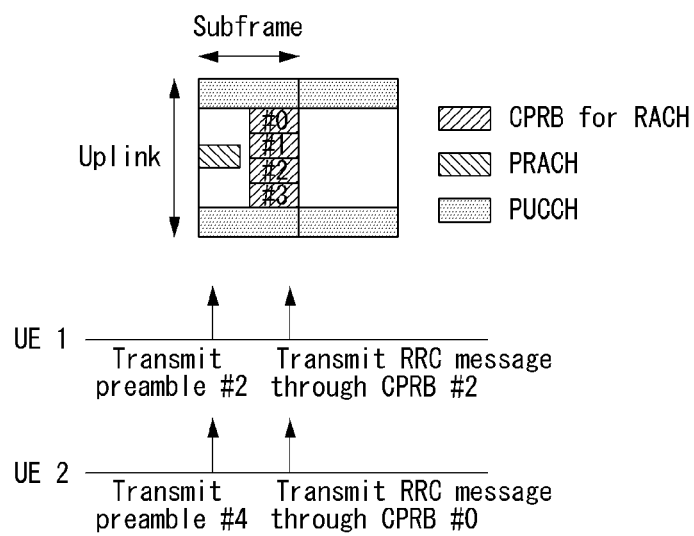

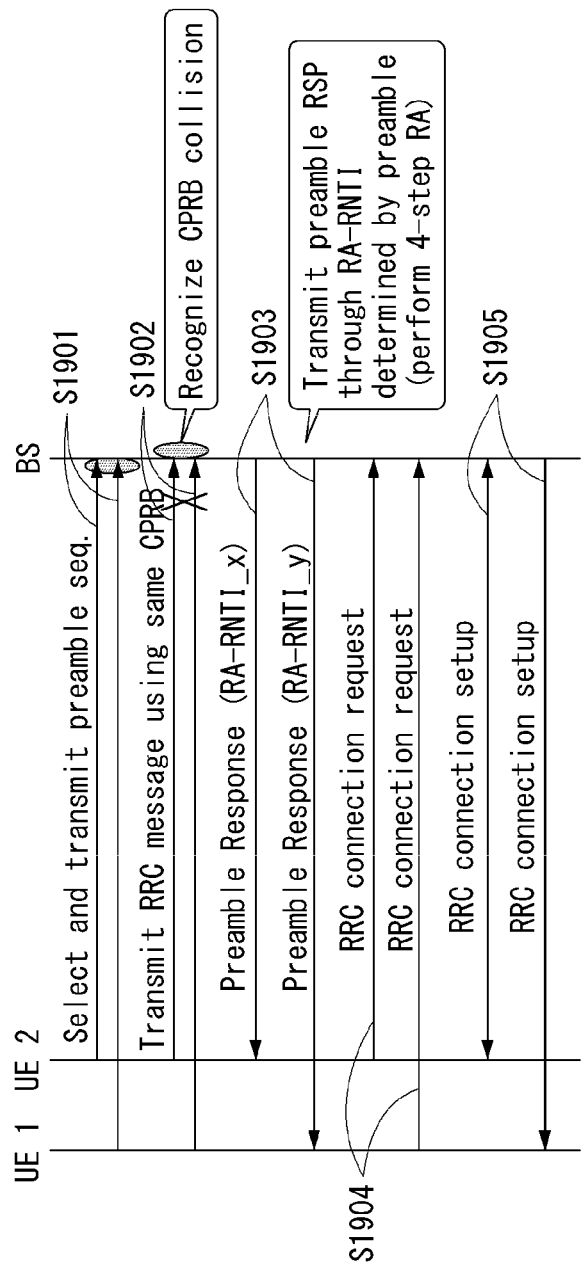
[Figure 19A]

【Figure 19B】
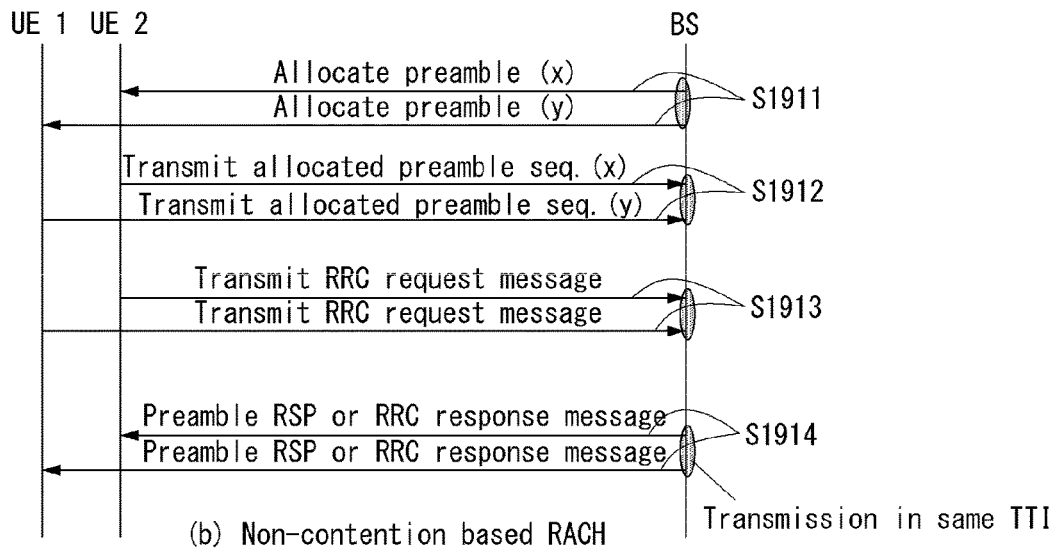
(b) Non-contention based RACH
【Figure 20A】
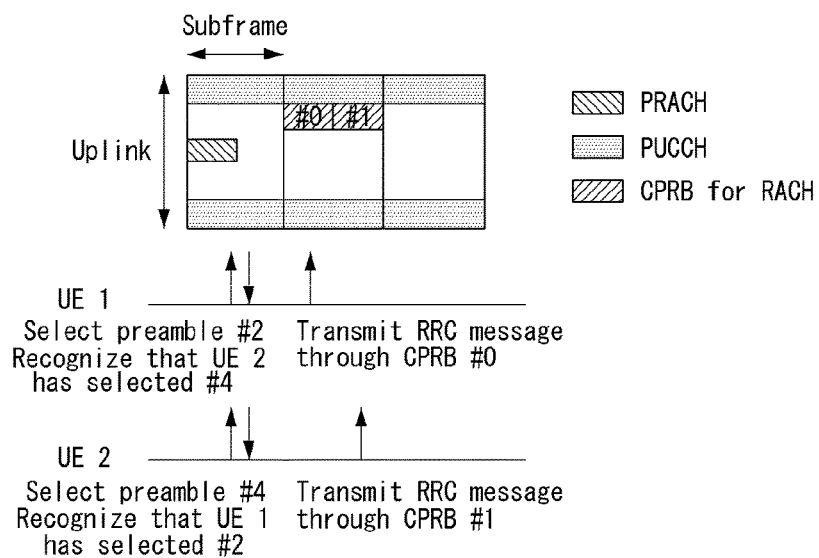

[Figure 20B]
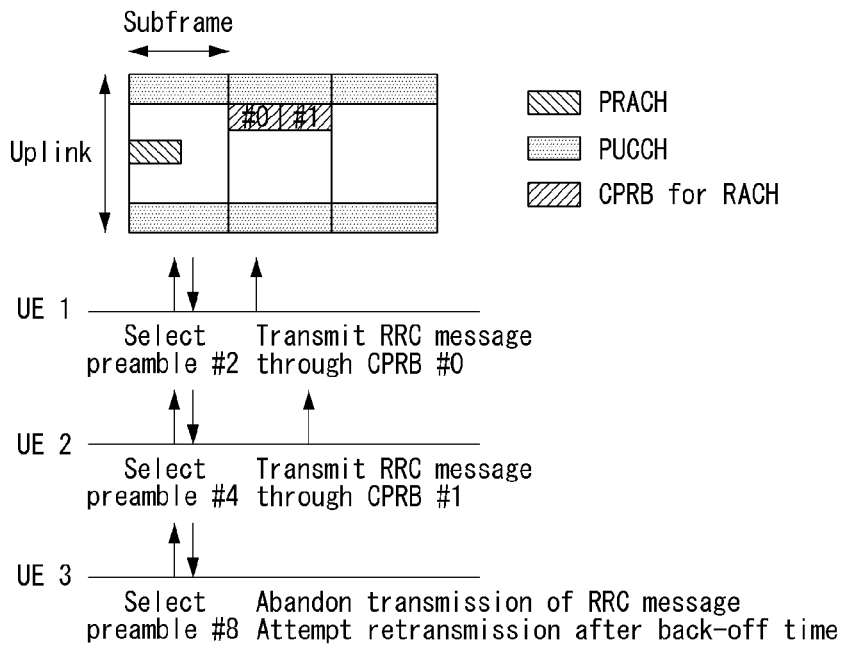
[Figure 21]
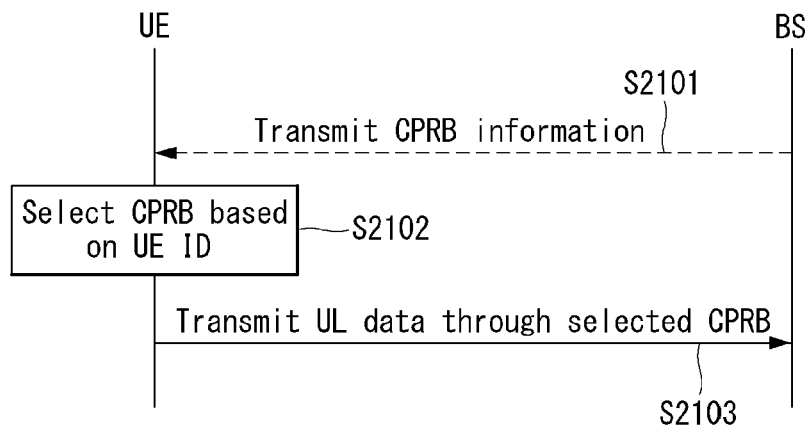

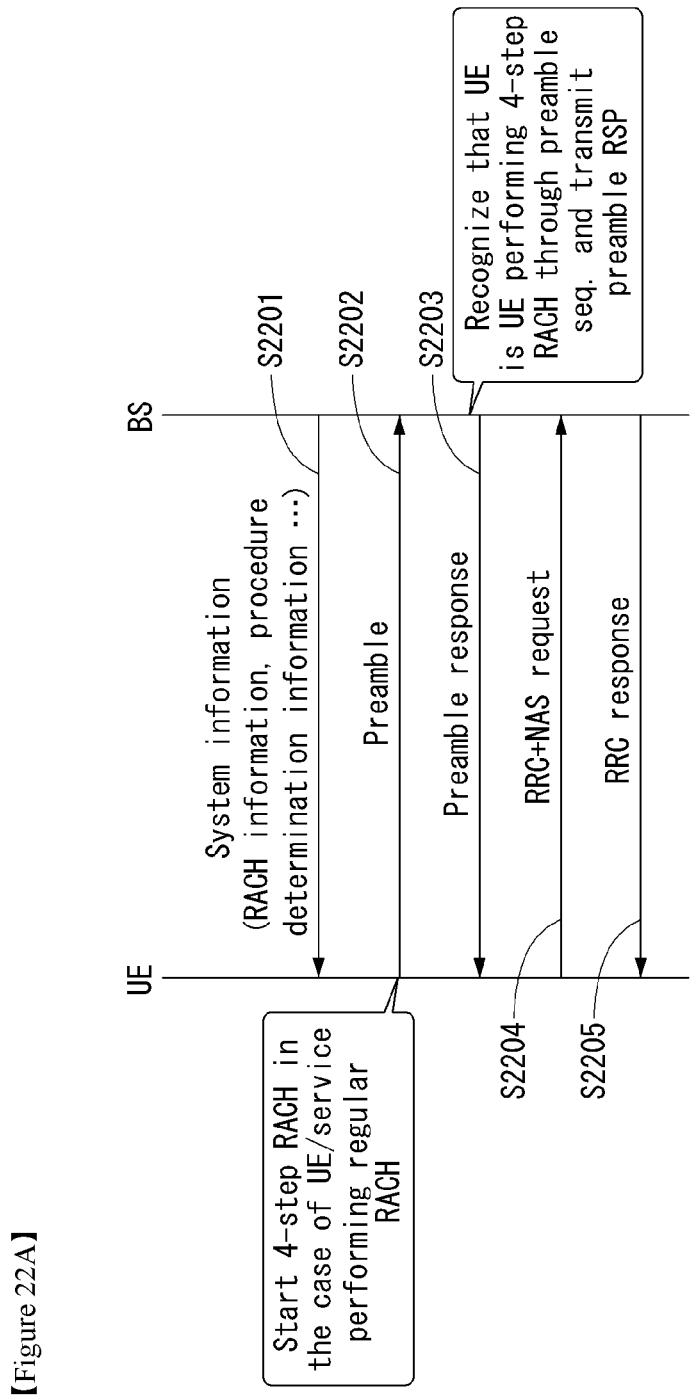

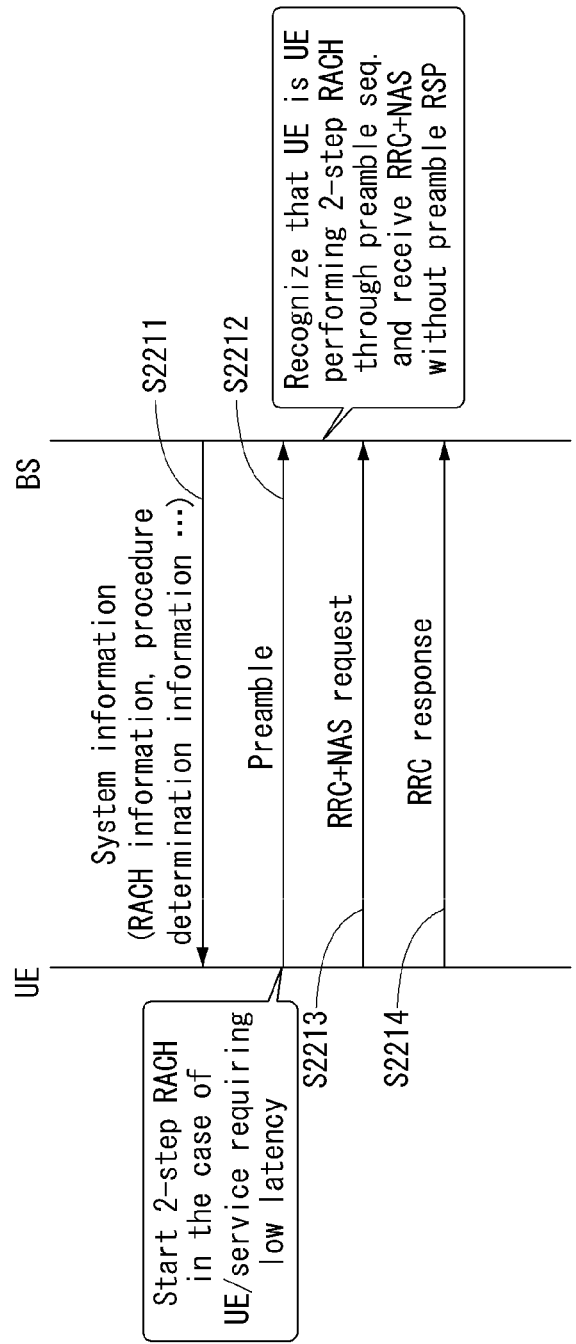
[Figure 22B]

【Figure 23】
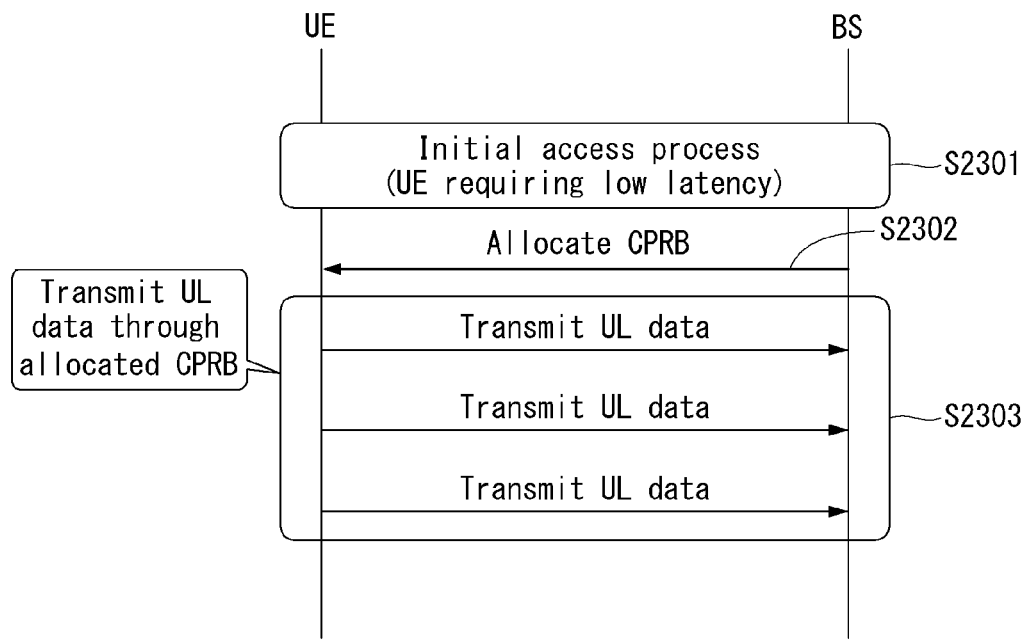

【Figure 24】
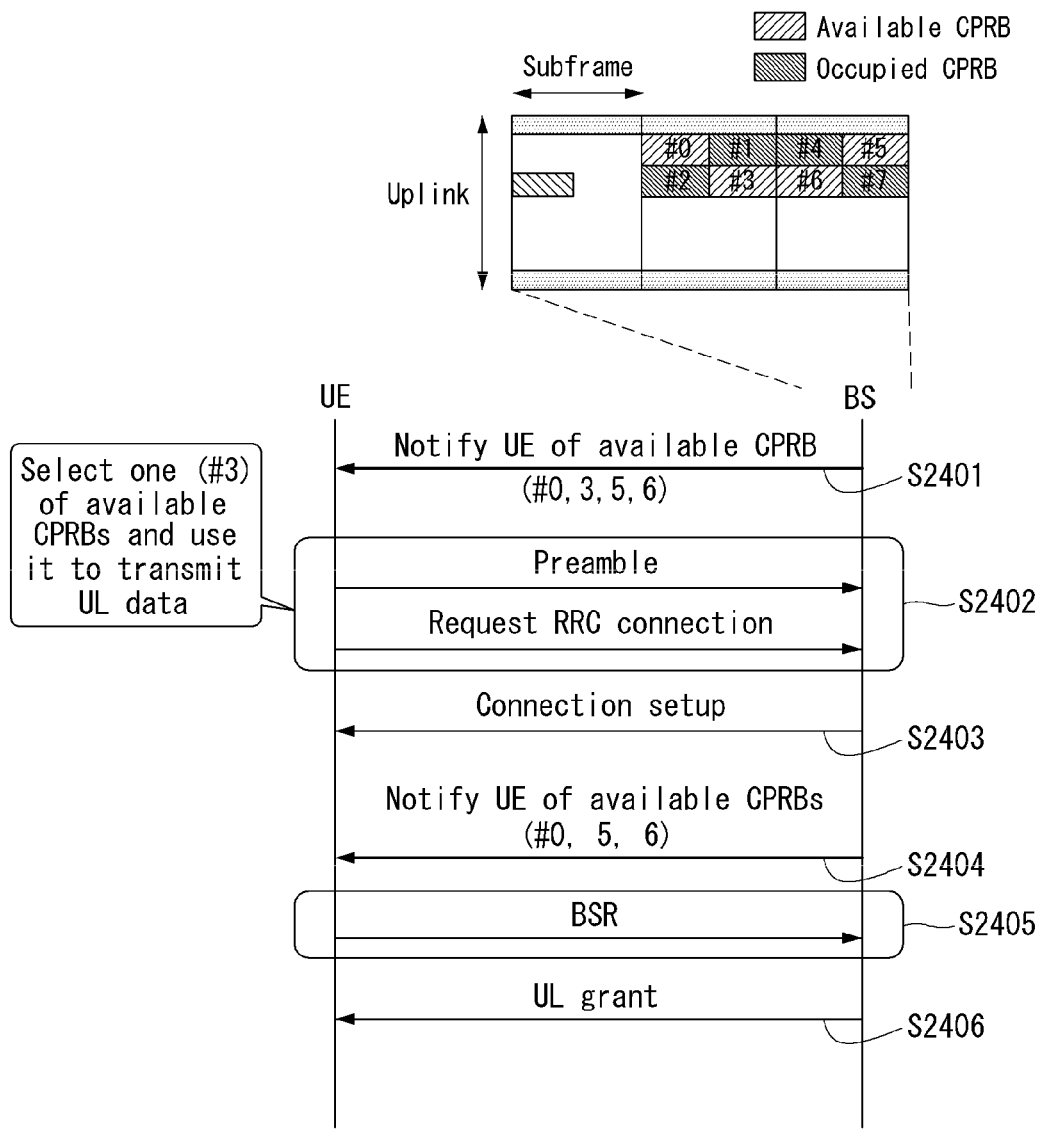

【Figure 25】
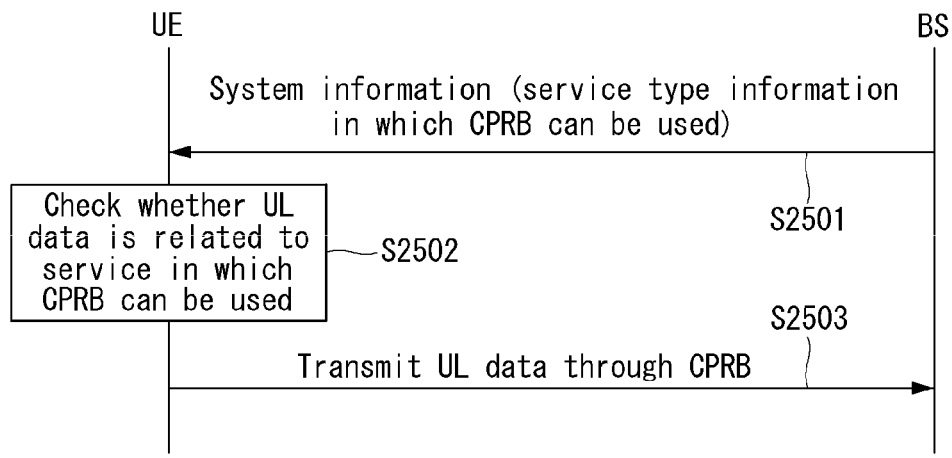
【Figure 26】
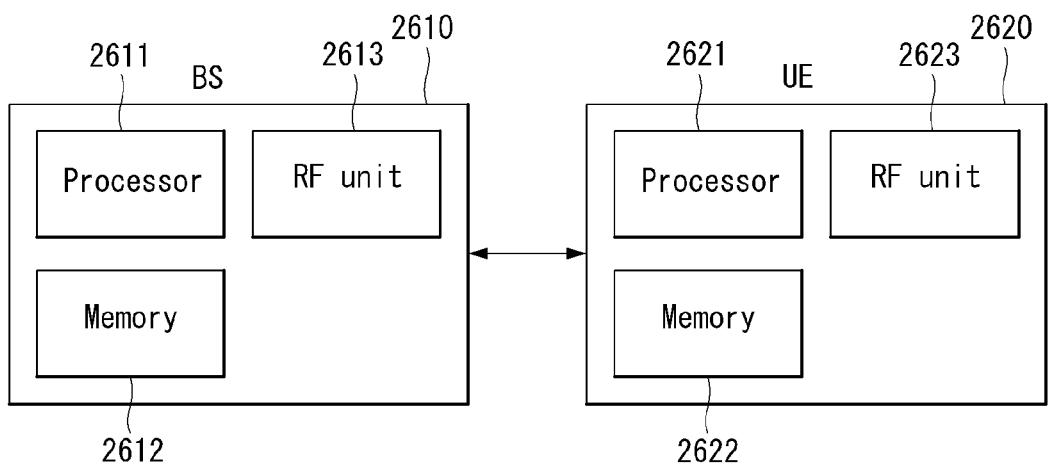

METHOD AND APPARATUS FOR TRANSMITTING UPLINK DATA HAVING LOW LATENCY IN WIRELESS COMMUNICATION SYSTEM

CROSS REFERENCE TO RELATED APPLICATIONS

This application is the National Phase of PCT International Application No. PCT/KR2014/011035, filed on Nov. 17, 2014, which claims priority under 35 U.S.C. 119(e) to U.S. Provisional Application No. 61/945,833, filed on Feb. 28, 2014, which is hereby expressly incorporated by reference into the present application.

TECHNICAL FIELD

This specification relates to a method and apparatus for transmitting uplink (UL) data having low latency.

BACKGROUND ART

In the case of a long term evolution (LTE) system, in order to maximize use of resources, a method for transmitting and receiving data through a BS scheduling-based resource allocation process is used.

In this method, if UE has data to be transmitted, it first requests the allocation of UL resources from a BS and sends data using only UL resources allocated by the BS.

This method causes latency even in the entire procedure in addition to the transmission of the UL data of UE.

Particularly, if UL data to be transmitted by UE is data that requires low latency, quality of service may be deteriorated when latency is generated as described above.

DISCLOSURE

Technical Problem

An object of this specification is to provide a method capable of occupying the allocation of UL resources to UE based on a contention in order to minimize procedure latency of UE in a (broadband) wireless communication system.

That is, an object of this specification is to provide a method for allowing UE to directly send UL data through the configuration of a contention-based PUSCH zone (CP zone).

Furthermore, an object of this specification is to provide a method for selectively operating a data transmission method based on an UL grant and a data transmission method based on a CP zone so that procedure latency of UE and use of all cell resources are satisfied.

That is, an object of this specification is to provide a method for using a CP zone for only UE and a service that require low latency and are sensitive to latency and for performing an UL grant-based procedure on UE and a service that are tolerant to latency.

Furthermore, an object of this specification is to provide a method for determining, by a BS, the type of procedure (the transmission of data based on an UL grant or the transmission of data based on a CP zone) performed by UE.

Objects to be achieved in this specification are not limited to the aforementioned advantages, and those skilled in the art to which the present invention pertains may evidently understand other objects from the following description.

Technical Solution

In this specification, a method for transmitting UL data requiring low latency in a wireless communication system is performed by user equipment, and includes the steps of receiving control information related to a contention-based PUSCH zone from a base station and transmitting UL data to the base station based on the received control information. The contention-based PUSCH zone includes a resource region in which the UL data of the user equipment may be transmitted without an UL grant allocated by the base station. The control information includes procedure determination information allocated to each type of specific procedure in order to determine the type of the specific procedure performed by the user equipment.

Furthermore, in this specification, the contention-based PUSCH zone includes at least one contention PUSCH resource block (CPRB).

Furthermore, in this specification, the UL data is transmitted to the base station through the CPRB.

Furthermore, in this specification, the procedure determination information includes a PRACH preamble sequence set including a first PRACH preamble sequence used for an RACH procedure based on a contention-based PUSCH zone (CP zone) and a second PRACH preamble sequence used for a common RACH procedure not using a CP zone.

Furthermore, in this specification, the UL data includes a radio resource control (RRC) request message. The method further includes the step of transmitting the first PRACH preamble sequence to the base station. The RRC request message and the first PRACH preamble sequence are transmitted simultaneously or consecutively. The RRC request message is transmitted through the contention-based PUSCH zone.

Furthermore, in this specification, the method further includes the step of receiving a PRACH preamble sequence allocated by the base station. The control information is transmitted through the step of receiving the PRACH preamble sequence allocated by the base station. The UL data includes a radio resource control (RRC) request message. The RRC request message is transmitted through the contention-based PUSCH zone.

Furthermore, in this specification, the control information includes at least one of CP zone resource region information indicative of a resource region which belongs to an UL resource region and to which a CP zone has been allocated and CPRB-related information indicative of information about a total number of CPRBs and available CPRBs within the CP zone.

Furthermore, in this specification, the CPRB is selected randomly, based on a PRACH preamble, or based on a user equipment identifier (ID).

Furthermore, in this specification, the UL data includes a buffer status report (BSR) message. The BSR message is transmitted through the contention-based PUSCH zone.

Furthermore, in this specification, the method further includes a step of transmitting actual data to the base station. The actual data is transmitted through the contention-based PUSCH zone along with the BSR message.

Furthermore, in this specification, the control information includes at least one of CPRB-user equipment mapping information indicative of user equipment mapped to each CPRB and service type information indicative of services in which a CP zone may be used.

The step of transmitting the RRC request message or transmitting the BSR message is performed if the user equipment is user equipment capable of using the contention-based PUSCH zone or if the UL data to be transmitted to the base station is related to a service in which the contention-based PUSCH zone may be used.

Furthermore, in this specification, the control information is transmitted through any one of a system information block (SIB), a master information block (MIB), and a control message.

Furthermore, in this specification, the method further includes the step of performing an initial access procedure along with the base station, wherein the control information is transmitted by the base station if the user equipment is user equipment requiring low latency through the initial access procedure.

Furthermore, in this specification, user equipment transmitting UL data requiring low latency in a wireless communication system includes a communication unit for communicating with an outside in a wired or wireless manner and a processor operatively connected to the communication unit. The processor controls the communication unit so that it receives control information related to a contention-based PUSCH zone from a base station and controls the communication unit so that it transmits UL data to the base station based on the received control information. The contention-based PUSCH zone includes a resource region in which the UL data of the user equipment may be transmitted without an UL grant allocated by the base station. The control information includes procedure determination information allocated to each type of specific procedure in order to determine the type of the specific procedure performed by the user equipment.

Advantageous Effects

This specification has an advantage in that latency of the entire procedure is minimized because UE directly sends UL data through the configuration of a contention-based PUSCH zone.

Furthermore, this specification has an advantage in that both procedure latency of UE and use of all cell resources are satisfied because a data transmission method based on an UL grant and a data transmission method based on a CP zone are selectively operated.

Furthermore, this specification has an advantage in that latency of the entire procedure can be reduced because a BS is able to be aware of the type of procedure, performed by UE, in advance and thus can recognize pieces of information to be transmitted to the UE or to be received from the UE rapidly and accurately.

Furthermore, this specification has an advantage in that latency of the entire initial access procedure can be reduced because a 4-step RACH procedure is performed as a 2-step RACH procedure if an RACH procedure is performed using a CP zone.

That is, there is an advantage in that a conventional initial random access procedure, that is, 15.5 ms, can be reduced to a minimum of 6.5 ms if a structure includes both a preamble and a CP zone are present within the same TTI.

In use of a proposed contention-based PUSCH zone, however, PUSCH resources collision may be generated between pieces of UE in a process of occupying a contention-based PUSCH resource block as the number of pieces of UE that perform an RACH simultaneously increases.

Furthermore, this specification has an advantage in that a CPRB resource collision which may occur in a process for occupying, by a plurality of pieces of pieces of UE, a Contention-based PUSCH Resource Block (CPRB) can be reduced because the number of pieces of UE trying to occupy UL resources through a CP zone within a cell can be limitedly designated.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a diagram showing an example of a network configuration of an Evolved Universal Terrestrial Radio Access Network (E-UTRAN).

FIG. 2A shows an example of a radio protocol structure for a control plane, and FIG. 2B shows an example of a radio protocol structure for a user plane.

FIG. 3 is a diagram showing an example of physical channels used in a 3GPP LTE-A system and a common signal transmission method using the physical channels.

FIG. 4 shows an example of a radio frame structure in 3GPP LTE-A.

FIG. 5 is a diagram showing an example of a resource grid for one downlink slot.

FIG. 6 is a diagram showing an example of a downlink subframe structure.

FIG. 7 is a diagram showing an example of an uplink subframe structure.

FIGS. 8A and 8B are diagrams showing examples of a random access procedure in an LTE system.

FIGS. 9A and 9B are diagrams showing examples of a BS scheduling-based resource allocation process in an LTE system.

FIG. 10A shows an example of a CP zone configuration, and FIG. 10B is a diagram showing an example of Contention PUSCH Resource Blocks (CPRBs) forming a CP zone.

FIG. 11 is a diagram showing another example of a CP zone configuration.

FIG. 12 is a diagram showing an example of an information transmission method related to a CP zone.

FIGS. 13A to 13C are diagrams showing examples of PRACHs and CP zone configurations if a CP zone is used in a random access procedure.

FIG. 14A shows an example in which a CP zone is used in a contention-based random access procedure, and FIG. 14B is a diagram showing an example in which a CP zone is used in a non-contention-based random access procedure.

FIG. 15A shows an example of an UL resource allocation process (3-step) using a CP zone, and FIG. 15B is a diagram showing an example of an UL resource allocation process (1-step) using a CP zone.

FIG. 16 shows an example when a collision related to the transmission of an RRC message is generated and when a collision related to the transmission of an RRC message is not generated in an RACH procedure using a CP zone.

FIG. 17 is a diagram showing an example of a method for minimizing a failure in the transmission of an RRC message through a CPRB in an RACH procedure using a CP zone.

FIGS. 18A and 18B are diagrams showing other examples of a method for minimizing a failure in the transmission of an RRC message through a CPRB in an RACH procedure using a CP zone.

FIGS. 19A and 19B are diagrams showing other examples of a method for minimizing a failure in the transmission of an RRC message through a CPRB in an RACH procedure using a CP zone.

FIGS. 20A and 20B are diagrams showing other examples of a method for minimizing a failure in the transmission of an RRC message through a CPRB in an RACH procedure using a CP zone.

FIG. 21 is a diagram showing another example of a method for minimizing a failure in the transmission of an RRC message through a CPRB in an RACH procedure using a CP zone.

FIGS. 22A and 22B are diagrams showing examples of a method for allowing a CP zone to be used only in specific UE or a specific service in an RACH procedure, which is proposed by this specification.

FIG. 23 is a diagram showing an example of a method for allowing a CP zone to be used for specific UE, which is proposed by this specification.

FIG. 24 is a diagram showing another example of a method for allowing a CP zone to be used for specific UE, which is proposed by this specification.

FIG. 25 is a diagram showing an example of a method for allowing a CP zone to be used for a specific service, which is proposed by this specification.

FIG. 26 is a diagram showing an example of the internal block diagrams of a BS and UE proposed by this specification.

MODE FOR INVENTION

In what follows, preferred embodiments according to the present invention will be described in detail with reference to appended drawings. The detailed descriptions given below with reference to appended drawings are intended only to provide illustrative embodiments of the present invention and do not represent the only embodiments thereof. The detailed descriptions of the present invention below include specific details for the purpose of comprehensive understanding of the present invention. However, those skilled in the art may readily understand that the present invention can be implemented without those specific details.

For some case, in order to avoid inadvertently making the technical concept of the present invention obscured, the structure and the apparatus well-known to the public can be omitted or illustrated in the form of a block diagram with respect to essential functions of the structure and the apparatus.

A base station in this document is defined as a terminal node of a network which carries out communication directly with a terminal. Particular operations in this document described to be carried out by a base station may be carried out by an upper node of the base station depending on the situation. In other words, it is evident that in a network consisting of a plurality of network nodes including a base station, various operations carried out for communication with terminals can be carried out the base station or other network nodes other than the base station. The term of base station (BS) can be substituted for by those terms such as fixed station, Node B, evolved-NodeB (eNB), base transceiver system (BTS), and access point (AP). Also, a terminal may be stationary or mobile and can be referred to by different terms such as a User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, and Device-to-Device (D2D) device.

In what follows, downlink transmission denotes communication from the BS to the UE, and uplink transmission denotes communication from the UE to the BS. In the downlink transmission, a transmitter can be a part of the BS while a receiver can be a part of the UE. In the uplink transmission, a transmitter can be a part of the UE while a receiver can be a part of the base station.

Particular terms used in the descriptions below are introduced to help understand the present invention and can be modified in various other ways as long as a modified use thereof does not depart from the technical principles and concept of the present invention.

Technologies described below can be used by various wireless access systems based on the scheme such as CDMA (code division multiple access), FDMA (frequency division multiple access), TDMA (time division multiple access), OFDMA (orthogonal frequency division multiple access), SC-FDMA (single carrier frequency division multiple access), and NOMA (non-orthogonal multiple access). The CDMA scheme can be implemented by a radio technology such as universal terrestrial radio access (UTRA) and CDMA2000. The TDMA scheme can be implemented by a radio technology such as global system for mobile communications (GSM), general packet radio service (GPRS), and enhanced data rates for GSM evolution (EDGE). The OFDMA scheme can be implemented by such as radio technology as defined by the IEEE 802.11 (Wi-Fi), IEEE 802.16 (WiMAX), IEEE 802.20, and evolved UTRA (E-UTRA). The UTRA is a part of standards specifying the universal mobile telecommunications system (UMTS). The 3rd generation partnership project (3GPP) long term evolution (LTE) is a part of standards of the evolved UMTS (E-UMTS) employing the E-UTRA, employing the OFDMA scheme for downlink transmission and the SC-FDMA scheme for uplink transmission. The LTE-A (Advanced) is an enhancement of the 3GPP LTE standard.

The embodiments of this document can be supported by at least one of the standard specifications for wireless access systems such as the IEEE 802, 3GPP, and 3GPP2. In other words, the standard specifications can be used to support those steps or parts among the embodiments of the present invention not explicitly described in favor of clarifying the technical principles thereof. Also, for technical definitions of the terms used in this document, the standard documents should be consulted.

For the purpose of clarity, this document is described based on the 3GPP LTE/LTE-A standard; however, it should be understood that the present invention is not limited to the specific standard.

The Overall System

FIG. 1 illustrates one example of a network structure of the evolved universal terrestrial radio access network (E-UTRAN) to which the present invention can be applied.

The E-UTRAN system is an enhancement of the UTRAN system, and can be referred to as the 3GPP LTE/LTE-A system. The E-UTRAN system includes eNBs which provide a control plane and a user plane to a UE, and the eNBs are connected to each other through X2 interface. The X2 user plane interface (X2-U) is defined among the eNBs. The X2-U interface is intended to provide non-guaranteed delivery of a user plane's packet data unit (PDU). The X2 control plane interface (X2-CP) is defined between two neighboring eNBs. The X2-CP performs the function of context delivery between eNBs, control of a user plane tunnel between a source eNB and a target eNB, delivery of handover-related messages, and uplink load management. An eNB is connected to a UE through an air interface and connected to an evolved packet core (EPC) through the S1 interface. The S1 user plane interface (S1-U) is defined between an eNB and a serving gateway (S-GW). The S1 control plane interface (S1-MME) is defined between an eNB and a mobility management entity (MME). The S1 interface performs an evolved packet system (EPS) bearer service management function, a non-access stratum (NAS) signaling transport function, network sharing, an MME load balancing function, and so on. The S1 interface supports many-to-many relation between an eNB and an MME/S-GW.

FIG. 2 illustrates a radio interface protocol structure defined between a UE and an E-UTRAN in a wireless communication system to which the present invention can be applied. FIG. 2(a) illustrates a radio protocol structure of a control plane, and FIG. 2(b) illustrates a radio protocol structure of a user plane.

With reference to FIG. 2, layers of a radio interface protocol between the UE and the E-UTRAN can be classified into a first layer (L1), a second layer (L2), and a third layer (L3) based on the lower three layers of the open system interconnection (OSI) model that is well-known in the communication system technology field. The radio interface protocol between the UE and the E-UTRAN is divided horizontally into a physical layer, a data link layer, and a network layer; and divided vertically into a user plane which is a protocol stack for data information transmission and a control plane which is a protocol stack for transmission of a control signal.

The control plane refers to a path along which control messages for the UE and the network to manage calls are transmitted. The user plane refers to a path along which data created in the application layer, for example, voice data or Internet packet data are transmitted. In what follows, the control plane and the user plane of the radio protocol will be described. The physical (PHY) layer belonging to the first layer provides an information transfer service to an upper layer by using a physical channel. The PHY layer is connected to the medium access control (MAC) layer belonging to the upper layer through a transport channel, and data are transferred between the MAC layer and the PHY layer through the transport channel. The transport channel is classified according to how and with what characteristics data are transferred through a radio interface. And a physical channel is employed to transfer data between disparate physical layers and between a physical layer of a transmitter end and a physical layer of a receiver end. The physical layer is modulated by OFDM scheme and uses time and frequency as radio resources.

There are a few physical control channels used in the physical layer. A physical downlink control channel (PDCCH) informs the UE of a paging channel (PCH), resource allocation of a downlink shard channel (DL-SCH), and hybrid automatic repeat request (HARQ) information related to an uplink shared channel (UL-SCH). Also, the PDCCH can carry an uplink grant which informs the UE of resource allocation for uplink transmission. A physical control format indicator channel (PDFICH) informs the UE of the number of OFDM symbols used for the PDCCHs and is transmitted for each subframe. A physical HARQ indicator channel (PHICH) carries a HARQ acknowledge (ACK)/non-acknowledge (NACK) signal in response to the uplink transmission. A physical uplink control channel (PUCCH) carries requests scheduling of the HARQ ACK/NACK signal for downlink transmission and carries uplink control information such as a channel quality indicator (CQI). A physical uplink shared channel (PUSCH) carries an UL-SCH.

The MAC layer of the second layer (L2) provides a service to its upper layer, radio link control (RLC) layer, through a logical channel. Functions of the MAC layer includes mapping between a logical channel and a transport channel; and multiplexing/demultiplexing of transport blocks provided to a physical channel on a transport channel of a MAC service data unit (SDU) belonging to the logical channel.

The RLC layer of the second layer (L2) supports reliable transmission of data. Functions of the RLC layer include concatenation, segmentation, and reassembly of the RLC SDU. To ensure various levels of quality of service (QoS) that a radio bearer (RB) requests, the RLC layer provides three operating modes: transparent mode (TM), unacknowledged mode (UM), and acknowledge mode (AM). The AM RLC provides error correction through an automatic repeat request (ARQ). Meanwhile, in case the MAC layer carries the RLC function, the RLC layer can be included as a functional block of the MAC layer.

A packet data convergence protocol (PDCP) layer of the second layer (L2) carries functions of transfer of user data in the user plane, header compression, and ciphering. The header compression refers to the function of reducing the size of the IP packet header which carries relatively large and unnecessary control information so that Internet protocol (IP) packets such as the Internet protocol version 4 (IPv4) or the Internet protocol version 6 (IPv6) can be transmitted efficiently through a radio interface with narrow bandwidth. Functions of the PDCP layer in the control plane include transfer of plane data and ciphering/integrity protection.

The radio resource control (RRC) layer located in the lowest part of the third layer (L3) is defined only in the control plane. The RRC layer controls radio resources between the UE and a network. To this end, the UE and the network exchanges RRC messages through the RRC layer. The RRC layer controls a logical channel, a transport channel, and a physical channel related to configuration, re-configuration, and release of radio bearers. A radio bearer refers to a logical path that the second layer (L2) provides for data transmission between the UE and the network. Configuring a radio bearer indicates that a radio protocol layer and channel characteristics are defined for providing a particular service and specific parameters and an operating method thereof are set up. A radio bearer is again divided into a signaling RB (SRB) and a data RB (DRB). The SRB is used as a path for transmitting RRC messages in the control plan, and the DRB is used as a path for transmitting user data in the user plane.

The non-access stratum (NAS) layer located in the upper hierarchy of the RRC layer performs the function of session management, mobility management, and so on.

A cell constituting an eNB has bandwidth chosen from among 1.25, 2.5, 5, 10, 2 MHz and provides a downlink or an uplink transmission service to UEs. Bandwidth configuration can be carried out so that different cells have bandwidth different from each other.

Downlink transport channels for transporting data from a network to a UE include a broadcast channel (BCH) which transmits system information, a PCH which transmits a paging message, a DL-SCH which transmits user traffic or a control message. Downlink multicast or broadcast service traffic or a control message may be transmitted through the DL-SCH or through a separate multicast channel (MCH). Meanwhile, uplink transport channels for transporting data from the UE to the network include a random access channel (RACH) which transmits the initial control message and an uplink shared channel which transmits user traffic or a control message.

A logical channel lies in the upper hierarchy of a transport channel and is mapped to the transport channel. A logical channel is divided into a control channel for transmission of control area information and a traffic channel for transmission of user area information. Logical channels include a broadcast control channel (BCCH), a paging control channel (PCCH), a common control channel (CCCH), a dedicated control channel (DCCH), a multicast control channel (MCCH), a dedicated traffic channel (DTCH), and a multicast traffic channel (MTCH).

To manage a UE and mobility of the UE in the NAS layer located in the control plane, an EPS mobility management (EMM) registered state and an EMM-deregistered state can be defined. The EMM registered state and the EMM de-registered sate can be applied to the UE and the MME. As in the case when the UE is powered on for the first time, the UE at its initial stage is in the EMM-deregistered state and carries out a process of registering for a network through an initial attach procedure to connect to the corresponding network. If the connection procedure is carried out successfully, the UE and the MME then make a transition to the EMM-registered state.

Also, to manage signaling connection between the UE and the network, an EPS connection management (ECM) connected state and an ECM-IDLE state can be defined. The ECM-CONNECTED state and the ECM-IDLE state can also be applied to the UE and the MME. The ECM connection includes an RRC connection established between the UE and an eNB and an S1 signaling connection established between the eNB and the MME. The RRC state indicates whether the RRC layer of the UE and the RRC layer of the eNB are connected logically to each other. In other words, if the RRC layer of the UE is connected to the RRC layer of the eNB, the UE stays in an RRC_CONNECTED state. If the RRC layer of the UE and the RRC layer of the eNB are not connected to each other, the UE stays in an RRC_IDLE state.

A network is capable of perceiving existence of a UE in the ECM-CONNECTED state at the cell level and controlling the UE in an effective manner. On the other hand, the network is unable to perceive the existence of a UE in the ECM-IDLE state, and a core network (CN) manages the UE on the basis of a tracking area which is a regional unit larger than the cell. If the UE is in the ECM-IDLE state, the UE carries out discontinuous reception (DRX) that the NAS configures by using the ID assigned uniquely in the tracking area. In other words, the UE can receive broadcast data of system information and paging information by monitoring a paging signal in a particular paging opportunity at each UE-particular paging DRX cycle. When the UE is in the ECM-IDLE state, the network does not hold context information of the UE. Therefore, the UE in the ECM-IDLE state can carry out a mobility-related procedure based on the UE such as cell selection or cell reselection without having to take an order of the network. In case the position of the UE in the ECM-IDLE state changes from the position known to the network, the UE can inform the network about its position through a tracking area update (TAU) procedure. On the other hand, if the UE is in the ECM-CONNECTED state, mobility of the UE is managed by the command of the network. While the UE is in the ECM-CONNECTED state, the network is informed of the cell to which the UE belongs to. Therefore, the network transmits and receives data to and from the UE, controls mobility such as the UE's handover, and carries out cell measurement of neighboring cells.

As described above, in order for the UE to receive a conventional mobile communication service such as voice or data communication, the UE needs to make a transition to the ECM-CONNECTED state. When the UE is powered on for the first time, the UE at its initial stage stays in the ECM-IDLE state similarly as done for the EMM state; if the UE is registered successfully to the corresponding network through the initial attach procedure, the UE and the MME make a transition to the ECM-CONNECTED state. Also, if the UE is registered in the network but radio resources are not assigned as traffic is deactivated, the UE stays in the ECM-IDLE state; if new uplink or downlink traffic is generated for the corresponding UE, the UE and the MME make a transition to the ECM-CONNECTED state through a service request procedure.

FIG. 3 illustrates physical channels used for the 3GPP LTE/LTE-A system to which the present invention can be applied and a general signal transmission method using the physical channels.

A UE, which may have been powered on again from the power-off state or may have newly entered a cell, carries out the initial cell search task such as synchronizing itself with an eNB in the S301 step. To this purpose, the UE synchronizes with the eNB by receiving a primary synchronization channel (P-SCH) and a secondary synchronization channel (S-SCH) from the eNB and obtains information such as a cell ID (identifier).

Afterwards, the UE receives a physical broadcast channel (PBCH) signal from the eNB and obtains broadcast signal within the eNB. Meanwhile, the UE receives a downlink reference signal (DL RS) in the initial cell search step to check the downlink channel status.

The UE which has finished the initial cell search receives a PDSCH according to the PDCCH and PDCCH information in the S302 step to obtain more specific system information.

Next, the UE may carry out a random access procedure such as the steps of S303 to S306 to complete a connection process to the eNB. To this purpose, the UE transmits a preamble S303 through a physical random access channel (PRACH) and receives a response message in response to the preamble through a PDSCH corresponding to the PRACH S304. In the case of contention-based random access, the UE may carry out a contention resolution procedure including transmission of an additional PRACH signal S305 and reception of a PDCCH signal and the PDSCH signal corresponding to the PDCCH signal S306.

Afterwards, the UE which has carried out the procedure above may carry out reception S307 of the PDCCH signal and/or PDSCH signal and transmission S308 of a PUSCH signal and/or a PUCCH signal as a conventional uplink/downlink signal transmission procedure.

The control information that the UE transmits to the eNB is called collectively uplink control information (UCI). The UCI includes HARQ-ACK/NACK, a scheduling request (SR), a channel quality indicator (CQI), a precoding matrix indicator (PMI), and rank indication (RI) information.

In the LTE/LTE-A system, the UCI is transmitted periodically through the PUCCH; the UCI can be transmitted through the PUSCH if control information and traffic data have to be transmitted at the same time. Also, the UCI can be transmitted non-periodically through the PUSCH according to a request or a command from the network.

FIG. 4 illustrates a radio frame structure defined in the 3GPP LTE/LTE-A system to which the present invention can be applied.

In the cellular OFDM wireless packet communication system, transmission of uplink/downlink data packets is carried out in units of subframes, and one subframe is defined as a predetermined time period including a plurality of OFDM symbols. The 3GPP LTE/LTE-A standard supports a type 1 radio frame structure that can be applied to frequency division duplex (FDD) scheme and a type 2 radio frame structure that can be applied to time division duplex (TDD) scheme. In the FDD mode, uplink transmission and downlink transmission are carried out separately in the respective frequency bands. On the other hand, for the TDD mode, uplink and downlink transmission are carried out separately in the time domain but occupy the same frequency band. Channel responses in the TDD mode are in fact reciprocal. This implies that a downlink channel response is virtually the same as the corresponding uplink channel response in the frequency domain. Therefore, it can be regarded as an advantage for a wireless communication system operating in the TDD mode that a downlink channel response can be obtained from an uplink channel response. Since the whole frequency domain is so utilized in the TDD mode that uplink and downlink transmission are performed in time division fashion, downlink transmission by an eNB and uplink transmission by a UE cannot be performed simultaneously. In a TDD system where uplink and downlink transmission are managed in units of subframes, uplink and downlink transmission are carried out separately in the respective subframes.

FIG. 4(a) illustrates a structure of a type 1 radio frame. A downlink radio frame consists of 10 subframes, and each subframe consists of two slots in the time domain. The time period needed to transmit one subframe is called a Transmission Time Interval (TTI). For example, length of each subframe can amount to 1 ms, and length of each slot can be 0.5 ms. Each slot includes a plurality of orthogonal frequency division multiplexing (OFDM) symbols in the time domain, and includes a plurality of resource blocks (RBs) in the frequency domain. The 3GPP LTE/LTE-A system uses the OFDMA method for downlink transmission; therefore, the OFDM symbol is intended to represent one symbol period. One OFDM symbol may be regarded to correspond to one SC-FDMA symbol or a symbol period. The resource block as a unit for allocating resources includes a plurality of consecutive subcarriers within one slot.

The number of OFDM symbols included within one slot can be varied according to the configuration of a cyclic prefix. The CP has an extended CP and a normal CP. For example, in case the OFDM symbol consists of normal CPs, the number of OFDM symbols included within one slot can be 7. In case the OFDM symbol consists of extended CPs, the number of OFDM symbols included within one slot becomes smaller than that for the normal CP case since the length of a single OFDM is increased. In the case of extended CP, for example, the number of OFDM symbols included within one slot can be 6. In case a channel condition is unstable as observed when the UE moves with a high speed, the extended CP can be used to further reduce inter-symbol interference.

Since each slot consists of 7 OFDM symbols when a normal CP is used, one subframe includes 14 OFDM symbols. At this time, the first maximum 3 OFDM symbols of each subframe are allocated to the physical downlink control channel (PDCCH) and the remaining OFDM symbols are allocated to the physical downlink shared channel (PDSCH).

FIG. 4(b) illustrates a type 2 radio frame. The type 2 radio frame consists of two half frames, and each half frame consists of 5 subframes, and each subframe consists of two slots. Among the 5 subframes, a special subframe consists of a downlink pilot time slot (DwPTS), a guard period (GP), and an uplink pilot time slot (UpPTS). The DwPTS is used for the UE to carry out the initial cell search, synchronization, and channel estimation. The UpPTS is used for the eNB to carry out channel estimation and uplink transmission synchronization with the UE. The GP is a period intended for removing interference generated during uplink transmission due to multi-path delay of a downlink signal between uplink and downlink transmission.

The structure of a radio frame described above is just an example, and the number of subframes included within one radio frame, the number of slots included within one subframe, and the number of symbols included within one slot can be varied in many ways.

FIG. 5 illustrates a resource grid with respect to one downlink slot in a wireless communication system to which the present invention can be applied.

With reference to FIG. 5, one downlink slot includes a plurality of OFDM symbols in the time domain. Each downlink slot includes 7 OFDM symbols, and each resource block includes 12 subcarriers in the frequency domain. However, the present invention is not limited to the illustrative configuration.

Each element of resource grids is called a resource element, and a resource block includes 12×7 resource elements. Each resource element in the resource grids can be identified by an index pair (k, l) within a slot. Here, k (k=0, . . . , NRB×12-1) stands for a subcarrier index in the frequency domain while l (l=0, . . . , 6) an OFDM symbol index in the time domain. The number NRB of resource blocks included in a downlink slot is dependent on downlink transmission bandwidth. The structure of an uplink slot can be the same as that of the downlink slot.

FIG. 6 illustrates a structure of a downlink subframe in a wireless communication system to which the present invention can be applied.

With reference to FIG. 6, in the first slot within a subframe, the first maximum three OFDM symbols make up a control region to which control channels are allocated, and the remaining OFDM symbols form a data region to which a PDSCH is allocated. The 3GPP LTE/LTE-A standard defines PCFICH, PDCCH, and PHICH as downlink control channels.

The PCFICH is transmitted from the first OFDM symbol of a subframe and carries information about the number (namely, size of the control region) of OFDM symbols used for transmission of control channels within a subframe. The PHICH is a response channel with respect to an uplink and carries a ACK/NACK signal with respect to HARQ. The control information transmitted through the PDCCH is called downlink control information (DCI). The DCI includes uplink resource allocation information, downlink resource allocation information, or uplink transmission (Tx) power control commands for an arbitrary UE group.

An eNB determines the PDCCH format according to Downlink Control Information (DCI) to be sent to a UE and adds a Cyclic Redundancy Check (CRC) to the control information. The CRC is masked with a unique identifier depending on an owner of the PDCCH or intended use of the PDCCH, which is called a Radio Network Temporary Identifier (RNTI). In the case of a PDCCH intended for a particular UE, a unique identifier for the UE, for example, Cell-RNTI (C-RNTI) can be masked with the CRC. Similarly, the CRC can be masked with a paging identifier, for example, Paging-RNTI (P-RNTI) in the case of a PDCCH intended for a paging message. The CRC can be masked with a system information identifier, for example, System Information-RNTI (SI-RNTI) in the case of a PDCCH intended for system information block. The CRC can be masked with a Random Access-RNTI (RA-RNTI) to designate a random access response in response to transmission of a random access preamble of the UE.

FIG. 7 illustrates a structure of an uplink subframe in a wireless communication system to which the present invention can be applied.

With reference to FIG. 7, an uplink subframe is divided into a control region and a data region in the frequency domain. A PUCCH which carries uplink control information is allocated to the control region. A PUSCH which carries data is allocated to the data region. If an upper layer commands, the UE can support the PUSCH and the PUCCH at the same time. A resource block pair is allocated within a subframe for the PUCCH of each UE. The resource blocks belonging to a resource block pair allocated to the PUCCH occupy different subcarriers at each of two slots based on a slot boundary. In this case, the resource block pair allocated to the PUCCH is said to perform frequency hopping at slot boundaries.

Random Access Channel (RACH) Procedure

FIG. 8A and FIG. 8B illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 8A illustrates one example of a contention-based random access procedure, and FIG. 8B illustrates one example of a non-contention based random access procedure.

First, the contention-based random access procedure will be described with reference to FIG. 8A.

The UE receives information about random access from the eNB through system information and stores the received information. Afterwards, in case random access is needed, the UE transmits a random access preamble (which is also called a message 1) to the eNB S801.

If the eNB receives a random access preamble from the UE, the eNB transmits a random access response message (which is also called a message 2) to the UE S802. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S2103. At this time, uplink transmission may be described as scheduled transmission.

After receiving the uplink transmission from the UE, the eNB transmits a message for contention resolution (which is also called a message 4) to the UE through a downlink shared channel (DL-SCH) S804.

Next, a non-contention based random access procedure will be described with reference to FIG. 8B.

Before the UE transmits a random access preamble, the eNB allocates a non-contention random access preamble to the UE S811.

The non-contention random access preamble can be allocated through a handover command or dedicated signaling such as signaling through the PDCCH. In case non-contention random access preamble is allocated to the UE, the UE transmits the allocated non-contention random access preamble to the eNB S812.

Afterwards, similarly to the S802 step of the contention-based random access procedure, the UE can transmit a random access response (which is also called a message 2) to the UE S813.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

BS Scheduling-Based Resource Allocation Process

FIGS. 9A and 9B are diagrams showing examples of a BS scheduling-based resource allocation process in an LTE system.

FIG. 9A is a diagram showing an example of the 5-step UL resource allocation process, and FIG. 9B is a diagram showing an example of the 3-step UL resource allocation process.

FIG. 9A illustrates an UL resource allocation process for actual data if UL radio resources for a buffer status report (BSR) have not been allocated to UE, and FIG. 9B illustrates an UL resource allocation process for actual data if UL radio resources for a BSR have been allocated to UE.

In an LTE system, in order to efficiently use UL radio resources, a BS needs to be aware that each piece of UE transmits what kind of data to what amount in uplink.

Accordingly, the UE transfers information related to UL data to be directly transmitted by the UE to the BS. The BS allocates resources for the transmission of the UL data to the UE based on the information.

In this case, the information related to UL data transmitted from the UE to the BS is the amount of the UL data stored in the buffer of the UE, and is called a BSR. The BSR is transmitted through an MAC control element if resources on a PUSCH are allocated to the UE in a current transmission time interval (TTI) and a reporting event has been triggered.

First, the 5-step UL resource allocation process is described below with reference to FIG. 9A.

UE transmits an UL scheduling request to a BS so that PUSCH resources are allocated to the UE (S901).

The scheduling request is used to request the BS to allocate PUSCH resources for the UL transmission of the UE if a reporting event was generated, but the PUSCH resources have not been scheduled for the UE on a PUSCH in a current TTI. That is, the UE transmits an SR on a PUCCH if a regular BSR has been triggered, but the UE does not have UL radio resources for transmitting the BSR to the BS.

The UE may send the SR through the PUCCH or initiate a random access procedure depending on whether the PUCCH resources for the SR have been configured. Specifically, a PUCCH resource in which the SR may be transmitted is configured by a higher layer (e.g., an RRC layer) in a UE-specific manner. The SR configuration includes SR periodicity and SR subframe offset information.

When the UE receives an UL grant for the PUSCH resources for the transmission of the BSR from the BS (S902), it transmits a regular BSR, triggered through the allocated PUSCH resources, to the BS (S903).

The BS checks the amount of actual data to be transmitted by the UE in uplink through the BSR, and transmits an UL grant for PUSCH resources for the transmission of the actual data to the UE (S904). The UE that has received the UL grant for the transmission of the actual data transmit the actual UL data to the BS through the allocated PUSCH resources (S905).

Referring to FIG. 9B, if PUSCH resources for the transmission of a BSR have already been allocated to UE, the UE transmits the BSR through the allocated PUSCH resources and also transmits the BSR to the BS along with a scheduling request (S911). Next, the BS checks the amount of data to be actually transmitted by the UE in uplink through the BSR, and transmits an UL grant for PUSCH resources for the transmission of the actual data to the UE (S912). The UE that has received the UL grant for the transmission of the actual data transmits the actual UL data to the BS through the allocated PUSCH resources (S913).

A method for minimizing C-plane latency of UE in a 5G system (or a future IMT-Advanced system) is described below. Contents related to the definition of a contention-based PUSCH zone (hereinafter referred to as a "CP zone"), a method for configuring a CP zone, and a method using a CP zone are described in detail below with reference to drawings.

Definition and Configuration of CP Zone

FIG. 10A shows an example of a CP zone configuration, and FIG. 10B shows an example of contention PUSCH resource blocks (CPRBs) forming a CP zone.

FIG. 10A shows an example of a CP zone configuration in the case of frequency division duplex (FDD).

First, the CP zone means a region in which UE may directly transmit UL data without separate resource allocation scheduling from a BS in relation to the transmission of the UL data of the UE.

The CP zone may be chiefly used for the transmission of the UL data of UE that requires low latency.

Referring to FIG. 10A, 1010 is a resource region in which a PUCCH is transmitted, and 1020 corresponds to a CP zone.

The CP zone may be allocated to a specific resource region of a PUSCH region in which UL data may be transmitted. That is, the CP zone may be allocated to one subframe (SF) or one or more contiguous subframes. A CP zone may not be allocated to a specific subframe.

FIG. 10B shows CPRBs. A CP zone may include one or more CPRBs.

The CPRB indicates a resource region within a CP zone which may be occupied by a piece of UE. A piece of UE is mapped to one CPRB 1030, but the present invention is not limited thereto. A plurality of CPRBs may be applied to a piece of UE by taking into consideration the capability of UE and the amount of UL data to be transmitted by UE. A plurality of pieces of UE may share one CPRB.

As shown in FIG. 10B, N (N is a natural number) CPRBs may be defined in one CP zone.

For example, if the number of pieces of UE using a CP zone is 3 (e.g., UE 1, UE 2, and UE 3) and the number of CPRBs forming the CP zone is 4 (e.g., a CPRB #1, a CPRB #2, a CPRB #3, and a CPRB #4), the CPRB #1 may be allocated to the UE 1, the CPRB #2 may be allocated to the UE 2, and the CPRB #3 may be allocated to the UE 3.

In this case, the CPRB allocated to each piece of UE may be configured by a BS, or a required CPRB may be allocated to each piece of UE when the UE requests the required CPRB from a BS when the UE receives information related to the CPRBs of the CP zone from the BS.

Furthermore, when a BS allocates a CPRB to each piece of UE, in the case of a small cell in which the number of pieces of UE (or the number of users) which may be accommodated in a cell is limited, the BS may map UE entering the cell and a CPRB in a one-to-one manner.

For example, if a maximum number of pieces of UE which may be accommodated in a small cell is N, the BS of the small cell may allocate a CP zone for the N pieces of UE in advance and may not allow UE, exceeding the number N, to enter the small cell so that pieces of UE within the small cell and CPRBs are mapped in a one-to-one manner.

If the one-to-one mapping method of UE and a CPRB is used for an RACH procedure after UE enters the small cell, a CPRB allocation method is implicitly agreed between the UE and the BS before the UE enters the small cell. That is, if UE having connectivity with a macro cell adds a connection with a small cell through dual connectivity, a CPRB may be previously allocated to the UE through a backhaul interface between the small cell and the macro cell.

In this case, the dual connectivity refers to a technology, such as an anchor-booster, a carrier aggregation, or simultaneous multi-RAT communication.

That is, if UE placed in a cell in which a CP zone has been configured has UL data that requires low latency, it may directly transmit the UL data to a BS through the configured CP zone without the scheduling (i.e., without an UL grant) of the BS for the transmission of the UL data.

A CP zone may be widely used in the transmission of the UL data of UE that requires low latency, but may be limitedly used for UL data to be transmitted in a specific procedure (e.g., the RRC request message and/or NAS request message of a random access procedure or the transmission of a BSR in a BSR procedure).

Furthermore, as shown in FIG. 11, a CP zone may be differently configured for each procedure.

A CP zone may be defined as one or more zones depending on its purpose. For example, a CP zone configured for an RACH procedure and a CP zone configured for a BSR procedure may be differently configured. That is, CP zones defined for different purposes may be configured in different subframes or may be configured in different resource regions within the same subframe.

From FIG. 11, it may be seen that a CP zone for an RACH procedure and a CP zone for a different procedure, such as a BSR, are differently configured.

Information Transmission Method Related to CP Zone

FIG. 12 is a diagram showing an example of an information transmission method related to a CP zone.

If a CP zone has been configured in a specific cell, a BS (or the specific cell) transmits control information related to the CP zone, configured in the specific cell, to pieces of UE (within the specific cell) (S1210).

In this case, the specific cell may mean a small cell, such as a femto cell, a pico cell or a micro cell, or a macro cell.

The CP zone-related control information includes CP zone configuration notification information indicating whether a CP zone has been configured in a specific cell.

Furthermore, the CP zone-related control information further includes CP zone configuration information, that is, information related to a CP zone configuration, such as the configuration of the CP zone, if a CP zone has been configured in a specific cell.

The CP zone configuration information may include information about UL resources in which a CP zone has been configured and information related to the transmission of data in which a CPRB within the CP zone may be transmitted.

The information about UL resources in which a CP zone has been configured may include information about an UL subframe in which a CP zone has not been configured by taking resource utilization into consideration.

As described above, one CP zone may include N (a natural number) CPRBs which may be occupied by one or more pieces of UE.

The information about UL resources in which a CP zone has been configured may include a value indicative of the number M of CP zones by which a specific piece of UE may attempt to occupy the resources of the CP zone at a specific point of time.

In this case, the N*M value is indicative of a total number of CPRBs which may be selected (or occupied) by the specific piece of UE at the specific point of time.

For example, if the number of CP zones having the same purpose and each having four CPRBs is 2 (the two CP zones form one CP group), UE may have 8 (4*2) candidate CPRBs.

The information related to the transmission of data which may be transmitted in a configured CPRB may include a maximum resource block size, a modulation and coding scheme (MCS) level, and an initial transmission power reference corresponding to each piece of UE.

The CP zone-related control information may be transmitted through a broadcast message or may be transmitted through a unicast message for specific UE.

Specifically, the CP zone-related control information may be transmitted using the following four methods, but is not limited thereto and may be transmitted in various ways.

First, the CP zone-related control information may be transmitted to UE through a master information block (MIB). The CP zone-related control information may be included in an MIB in which essential physical layer information is transmitted.

Second, the CP zone-related control information may be transmitted to UE through the existing SIB-x.

If the CP zone-related control information is transmitted through the SIB-x, it corresponds to a case where a CP zone is configured for a network connection. In this case, the CP zone-related control information may be included in an SIB-2 and transmitted.

For example, if a CP zone is configured for an RACH procedure, information about the CP zone may be added to an SIB-2 so that UE previously recognizes that it may access a cell through the transmission of a contention-based RRC connection request message (e.g., 2-step RA) before the UE accesses the cell.

Third, the CP zone-related control information may be transmitted to UE through a new SIB-y.

That is, if a CP zone is configured for a procedure subsequent to a network connection, the CP zone-related control information may be transmitted through the definition of a new SIB.

In this case, a BS may include indication, providing notification that a cell is a cell that needs to receive the new SIB information, in an MIB, SIB-1 or SIB-2, and may transmit the MIB, SIB-1 or SIB-2 to UE.

Fourth, the CP zone-related control information may be transmitted to specific UE through a new control message in a unicast manner.

When UE accesses a cell, the CP zone-related control information is transmitted to UE that needs to use a CP zone through a unicast message so that the CP zone-related control information can be received by only the specific UE.

In this case, when the UE accesses (or enters) the cell, it may include information, providing notification of the use of the CP zone, in a message to be transmitted to a BS and transmit the message to the BS. Accordingly, the BS may transmit the CP zone-related control information to the UE through a unicast message.

As described above, the CP zone configuration notification information and the CP zone configuration information may be included in the CP zone-related control information and may be transmitted to pieces of UE in various formats (e.g., an SIB, a MIB, and a unicast message). The CP zone notification information and the CP zone configuration information may be separately transmitted through different messages.

In this case, although the CP zone configuration notification information and the CP zone configuration information are separately transmitted, they may be transmitted through the various formats, such as the SIB, MIB, and unicast message.

FIGS. 13A to 13C are diagrams showing examples of PRACHs and CP zone configurations if a CP zone is used in a random access procedure.

When UE performs an RACH procedure using a CP zone, it may transmit an RRC message to a BS through the CP zone along with an RACH preamble sequence or consecutively.

That is, in the case of an RACH procedure based on a CP zone, UE may transmit an RACH preamble sequence and an RRC message to a BS at the same time or using consecutive time resources, unlike in a common RACH procedure for transmitting an RRC message only when UE receives an UL grant through a random access response message after it transmits an RACH preamble sequence.

First, FIG. 13A is a diagram showing an example in which PRACHs and CP zones have been configured according to an intra-subframe method.

The intra-subframe configuration method means that a PRACH resource region and a CP zone resource region are divided into different resources and allocated (TDM or FDM) within the same subframe.

A figure on the left side of FIG. 13A shows that a PRACH resource region and a CP zone resource region are allocated as different time resources in the same subframe. A figure on the right side of FIG. 13A shows that a PRACH resource region and a CP zone resource region are allocated as different frequency resources in the same subframe.

FIG. 13B is a diagram showing an example in which PRACHs and CP zones are configured according to an inter-subframe method.

The inter-subframe configuration method means that a PRACH resource region and a CP zone resource region are divided into the resources of contiguous subframes, that is, different TTIs, and are allocated.

From FIG. 13B, it may be seen that a CP zone resource region has been allocated to a subframe next to a subframe to which a PRACH resource region has been allocated.

FIG. 13C shows an example in which PRACHs and CP zones are configured according to a mixture of the intra-subframe method and the inter-subframe method.

That is, the method of mixing the intra-subframe method and the inter-subframe method means that a PRACH resource region or a CP zone resource region is not configured in a specific subframe in order to maximize the utilization of resources within a cell.

From FIG. 13C, it may be seen that only a PRACH is allocated to one subframe and both a PRACH resource region and a CP zone resource region are allocated to a next subframe.

In this case, it may be seen that the PRACH resource region and the CP zone resource region are allocated using different frequency resources.

In addition to the methods of FIGS. 13A to 13C, a method for configuring PRACHs and CP zones may be various depending on a cell operation scheme.

RACH Procedure and BSR Procedure Based on CP Zone

Methods using a CP zone in an RACH procedure and a BSR procedure are described in detail below with reference to drawings.

First, the method using a CP zone in the RACH procedure is described below.

If a CP zone is used in the RACH procedure, UE may use the CP zone as an UL resource in order to transmit RRC+NAS request messages corresponding to 1 to 3 below.

That is, in the case of a contention-based random access procedure (i.e., the 4-step RACH procedure), a CP zone may be used to transmit the message 3 of FIG. 8A. Furthermore, in the case of a non-contention-based random access procedure (i.e., the 3-step RACH procedure), a CP zone may be used as an UL resource in order to transmit an RRC message after the RACH procedure of FIG. 8B.

The RRC request message transmitted through the CP zone may correspond to any one of the following messages depending on a procedure in which an RACH is performed.

1. If an RACH procedure is performed for initial access, an RRC request message transmitted through a CP zone is an RRC connection request message.

2. If an RACH procedure is performed for handover (HO), an RRC request message transmitted through a CP zone is an RRC connection reconfiguration complete message.

3. If an RACH procedure is performed for RRC connection reestablishment, an RRC request message transmitted through a CP zone is an RRC connection re-establishment request message.

FIG. 14A shows an example in which a CP zone is used in a contention-based random access procedure, and FIG. 14B is a diagram showing an example in which a CP zone is used in a non-contention-based random access procedure.

Referring to FIG. 14A, UE transmits an RACH preamble sequence through a PRACH and transmits an RRC message to a BS through a CP zone (specifically, a CPRB of the CP zone) simultaneously or consecutively (S1401).

Thereafter, the BS transmits a contention resolution message to the UE as an RRC response message (S1402).

That is, UE transmits an RRC message through a CP zone without a separate UL grant from a BS and receives an UL grant from the BS. Accordingly, there is an advantage in that the time taken to transmit an RRC message can be reduced.

That is, the UE performs a contention-based random access procedure through the CP zone, and thus can perform the 2-step RACH procedure by transmitting the message 3 and the RACH preamble sequence simultaneously or consecutively.

Referring to FIG. 14B, after an RACH preamble sequence is allocated to UE by a BS (S1411), the UE transmits an RRC message to the BS simultaneously or consecutively with the allocated preamble sequence (S1412). In this case, the allocated preamble sequence is transmitted through a PRACH, and the RRC message is transmitted to the BS through a CPRB of a CP zone.

Thereafter, the BS transmits a random access response message to the UE as a response to random access (S1413).

If an RRC message is transmitted through a CP zone as described above, the entire RRC procedure (e.g., handover (HO) execution) can be performed more rapidly because the an RRC message that could have been transmitted after an RACH procedure is simultaneously transmitted along with the execution of the RACH procedure.

In FIGS. 14A and 14B, the UE may omit the transmission of an RACH preamble to the BS.

If the transmission of the RACH preamble of the UE is omitted, it corresponds to a case where a timing alignment (TA) value for UL synchronization in the RACH procedure has been previously obtained by the UE through the reception of DL data from the BS.

That is, the UE may obtain the TA value in advance by using GPSs or previously obtaining a time difference value between BSs.

If the transmission of the RACH preamble of the UE is omitted, the UE performs the RACH procedure by transmitting only RRC messages corresponding to steps S1401 and S1412 of FIGS. 14A and 14B to the BS through a CPRB.

As a result, if a CP zone is used for the RACH procedure, the RACH procedure is different from a common RACH procedure not using a CP zone as follows.

1. A contention-based random access procedure: from the 4-step RACH procedure to the 2-step RACH procedure.

2. A non-contention-based random access procedure: from the 3-step RACH procedure+the transmission of an RRC message to the 3-step RACH procedure including the transmission of an RRC message.

The method using a CP zone in the BSR procedure is described below.

As described above with reference to FIGS. 9A and 9B, a common BS scheduling-based UL resource allocation method not using a CP zone includes the 5-step UL resource allocation process and the 3-step UL resource allocation process.

The 5-step UL resource allocation process includes a 5-step process. That is, UE requests UL scheduling from a BS, the BS transmits an UL grant for a BSR to the UE, and the UE transmits the BSR to the BS. Thereafter, the BS transmits an UL grant for the transmission of the actual data of the UE to the UE. The UE transmits the actual data to the BS through the UL grant.

Furthermore, the 3-step UL resource allocation process includes a 3-step process. That is, UE transmits a BRR to a BS simultaneously with an UL scheduling request. The BS transmits an UL grant for the transmission of the actual data of the UE to the UE. Thereafter, the UE transmits the actual data to the BS through the UL grant.

The BS scheduling-based UL resource allocation process using a CP zone is changed to a 3-step UL resource allocation process in the case of 5-step and is changed to a 1-step UL resource allocation process in the case of 3-step, as shown in FIGS. 15A and 15B.

FIG. 15A shows an example of an UL resource allocation process (i.e., 3-step) using a CP zone, and FIG. 15B is a diagram showing an example of an UL resource allocation process (i.e., 1-step) using a CP zone.

As shown in FIG. 15A, in the BS scheduling-based 3-step UL resource allocation process using a CP zone, UE directly transmits a BSR to a BS through a CP zone without receiving an UL grant for a BSR from the BS (S1502).

Thereafter, the UE receives an UL grant for the transmission of actual data from the BS and transmits the actual data to the BS using the received UL grant (S1503~S1504).

Furthermore, as shown in FIG. 15B, UE may transmit a BSR to a BS along with actual data using a CP zone (S1512).

Accordingly, if an UL resource allocation process is performed using a CP zone, a common 5-step UL resource allocation process is changed to the 3-step UL resource allocation process, and a common 3-step UL resource allocation process is changed to the 1-step UL resource allocation process.

In this case, in order to perform the UL resource allocation process (i.e., the 3-step and the 1-step) using a CP zone, first, the BS transmits the aforementioned CP zone-related control information to the UE (S1501, S1511).

The CP zone-related control information may be transmitted though an SIB because it is system-related information, but is not limited thereto and may be transmitted in various manners.

If an UL resource allocation process is performed using a CP zone as described above, there is an advantage in that latency of the entire procedure can be reduced compared to a common BS scheduling-based UL resource allocation process because UE requests UL resources from a BS and the time that UL resources are taken to be allocated by a BS is reduced.

Methods for Minimizing CPRB Collision

Methods for solving a collision which may occur when two or more pieces of UE transmit data through a CP zone are described in detail below by taking a case where an RACH procedure is performed as an example.

First, a collision may be generated in a CP zone in the process of occupying CPRBs because pieces of UE attempting to perform RACH procedures occupy resources, that is, the CPRBs, through a contention.

In this case, there is a problem in that the RACH procedures may fail due to a collision through the simultaneous occupation of PUSCH resources although two or more pieces of UE select different RACH preamble sequences.

FIG. 16 shows an example if a collision is generated in the transmission of RRC messages and if a collision is not generated in the transmission of RRC messages, when two pieces of UE perform RACH procedures at the same time through a CP zone having two CPRBs.

First, the left portion of FIG. 16 shows an example in which a collision is generated in the transmission of RRC messages.

UE 1 and UE 2 transmit different RACH preamble sequences to a BS in the PRACH region of a first subframe.

The UE 1 and the UE 2 transmit respective RRC messages to the BS through the CPRB #2 of a CP zone configured in a next (i.e., second) subframe. In this case, a collision is generated because the UE 1 and the UE 2 occupy the same CPRB (CPRB #2). As a result, the transmission of the RRC messages of the UE 1 and the UE 2 fail.

In contrast, the right portion of FIG. 16 shows an example in which a collision is not generated in the transmission of RRC messages.

The UE 1 and the UE 2 transmit different RACH preamble sequences to the BS in the PRACH region of a seventh subframe.

Thereafter, the UE 1 transmits an RRC message to a BS through the CPRB #2 of a CP zone allocated to a next (i.e., eighth) subframe. The UE 2 transmits an RRC message to the BS through the CPRB #1 of the CP zone allocated to the next (i.e., eighth) subframe.

In this case, the UE 1 and the UE 2 successfully transmit the RRC messages because they do not occupy the same CPRB and thus a CPRB collision is not generated.

FIG. 17 is a diagram showing an example of a method for minimizing a failure in the transmission of an RRC message through a CPRB by randomly selecting the CPRB when an RACH procedure is performed using a CP zone.

That is, in this method, each of pieces of UE randomly selects a CPRB in a CP zone at a point of time at which a PRACH is transmitted and transmits an RRC message through the randomly selected CPRB.

In this case, if the transmission of an RRC message fails because the CPRB randomly selected by the pieces of UE is simultaneously occupied by the pieces of UE, each of the pieces of UE performs an RACH procedure again using a back-off time (i.e., the retransmission of an RACH preamble and an RRC message).

That is, if each of the pieces of UE performs the RACH procedure again, the back-off time for performing the RACH procedure again is differently set in each piece of UE so that a collision is not generated due to the simultaneous occupation of a CPRB.

In this case, the back-off time may be set by a BS or in response to a request from the UE.

For example, the back-off time may be set so that UE 2 transmits a preamble and an RRC message in a next cycle after UE 1 transmits an RACH preamble and an RRC message.

In this case, although an RACH procedure has been designed so that a PRACH is not transmitted, the method for randomly selecting a CPRB may be identically applied.

This is described in detail with reference to FIG. 17. The UE 1 and the UE 2 transmit different RACH preamble sequences to a BS through a PRACH region allocated to a first subframe.

Thereafter, the UE 1 and the UE 2 randomly select CPRBs which may use a CP zone. As shown in FIG. 17, the UE 1 and the UE 2 select the same CPRB #2.

In this case, a point of time at which each of the pieces of UE randomly selects the CPRB may be a point of time at which the UE receives CP zone-related control information from the BS, the UE transmits the RACH preamble to the BS, or the UE transmits an RRC message to the BS through the CPRB of the CP zone.

Accordingly, if the UE 1 and the UE 2 transmit RRC messages through the selected CPRB #2, they fail in transmitting the RRC messages.

Thereafter, after a lapse of a back-off time applied to each of the pieces of UE in order to perform an RACH procedure again after an RRC message timer expires, the UE 1 and the UE 2 transmit preambles through respective PRACHs and transmit the RRC messages to the BS through the CPRB #2 randomly selected by the UE 1 and the UE 2.

In other words, the UE 1 and the UE 2 transmit the RRC messages to the BS using the previously randomly selected CPRB without any change using the different back-off times.

In this case, the UE 1 and the UE 2 may randomly select CPRBs again after the back-off times. However, in order to minimize a collision attributable to the simultaneous occupation of a CPRB, the UE 1 and the UE 2 may transmit RRC messages through the selected CPRB.

In this case, information about the back-off time applied to each of the pieces of UE may be transmitted from the BS to each of the pieces of UE when a collision occurs between the RRC messages. In this case, the BS may differently set the back-off time in each of the pieces of UE by taking into consideration UL data having higher priority in each of the pieces of UE.

FIG. 17 shows an example in which the UE 2 having a shorter back-off time first transmits an RRC message to the BS through the CPRB #2 of a CP zone and the UE 1 transmits an RRC message to the BS through the CPRB #2 in a period to which a next CP zone is allocated.

FIGS. 18A and 18B are diagrams showing examples of a method for minimizing a failure in the transmission of an RRC message through a CPRB by implicitly selecting a CPRB based on a randomly selected preamble when an RACH procedure is used using a CP zone.

That is, in this method, UE randomly selects an RACH preamble sequence (in the case of a contention-based RACH procedure) or selects a CPRB to be used based on an RACH preamble sequence allocated by a BS (in the case of a non-contention-based RACH procedure).

A method for implicitly selecting a CPRB according to FIGS. 18A and 18B is performed through modulo operation of Equation below.

A CPRB(#)selected by UE=modulo(a selected RACH preamble sequence % $N$)

In this case, N indicates a total number of CPRBs which may be occupied by UE that transmits an RACH preamble. Furthermore, the N value is a value received from a BS through system information.

In the case of the non-contention-based RACH procedure, UE occupies a CPRB based on an RACH preamble sequence previously allocated by a BS. Accordingly, the BS may allocate an RACH preamble sequence to each of pieces of UE in advance so that a collision in occupying a CPRB is not generated between the pieces of UE which may perform the non-contention-based RACH procedure.

FIG. 18A is an example in which CPRBs are allocated according to a time division multiplexing (TDM) method, and FIG. 18B shows an example in which CPRBs are allocated according to a frequency division multiplexing (FDM) method.

As shown in FIGS. 18A and 18B, UE 1 selects an RACH preamble sequence #2, UE 2 selects an RACH preamble sequence #4, and a total number of CPRBs of a CP zone is 4.

In this case, if the CPRBs selected by the UE 1 and the UE 2 are calculated according to Equation 1, the CPRB selected by the UE 1 is CPRB #2 (modulo (2/4)), and the CPRB selected by the UE 2 is CPRB #0 (modulo (4/4)).

Accordingly, the UE 1 transmits an RRC message to a BS through the CPRB #2, and the UE 2 transmits an RRC message to a BS through the CPRB #0.

Methods for solving a collision when a CPRB collision is generated in the methods of FIGS. 18A and 18B are described below in connection with the contention-based RACH procedure and the non-contention-based RACH procedure.

First, in the case of the contention-based RACH procedure, if two or more pieces of UE select the same CPRB by selecting the same RACH preamble at the same time or selecting the same RACH preamble having an N multiple, a CPRB collision may be generated.

In this case, a BS transmits information indicating that the common 4-step RACH procedure not using a CP zone to each of pieces of UE.

This is described in detail below with reference to FIG. 19A. UE 1 and UE 2 transmit randomly selected RACH preambles to a BS (S1901).

Thereafter, the UE 1 and the UE 2 select CPRBs according to Equation 1, but the UE 1 and the UE 2 fail in transmitting RRC messages due to the selection of the same CPRB (S1902).

When the BS detects the failure in the transmission of the RRC messages attributable to the CPRB collision, it transmits information, indicating that the common 4-step RACH procedure needs to be performed without using a CP zone, to each of the pieces of UE as a preamble response using an RA-RNTI determined by the reception of the RACH preamble of each of the pieces of UE (S1903). The RA-RNTI transmitted from the BS to the UE 1 is an RA_RNTI_y, and the RA-RNTI transmitted from the BS to the UE 2 is an RA_RNTI_x.

Thereafter, the UE 1 and the UE 2 transmit RRC connection request messages to the BS (S1904). The BS transmits an RRC connection setup messages to the UE 1 and the UE 2 (S1905).

In the case of the non-contention-based RACH procedure, since the BS allocates an RACH preamble sequence to the UE, it allocates an RACH preamble so that a CPRB collision is not generated between the pieces of UE which select CPRBs through the RACH preamble sequences (S1911).

The UE that has received the RACH preamble from the BS transmits an RRC request message to the BS through modular (mod) operation using a preamble sequence number and N (i.e., a total number of CPRBs of a CP zone).

This is described in detail below with reference to FIG. 19B. The BS allocates a preamble x and a preamble y to the UE 1 and the UE 2, respectively, so that CPRBs (selected according to Equation 1) do not collide against each other.

The UE 1 and the UE 2 transmit the RRC request messages to the BS through the CPRBs selected by the UE 1 and the UE 2 along with the allocated RACH preamble sequences or consecutively (S1912-S1913).

Thereafter, the BS transmits preamble response messages or RRC response messages to the UE 1 and the UE 2 (S1914).

In this case, steps S1911 to S1914 are performed in the same TTI.

FIGS. 20A and 20B are diagrams showing an example of the method of FIG. 18A and FIG. 18B for pieces of full duplex relay (FDR) UE.

In this case, the pieces of UE are assumed to be pieces of UE capable of performing FDR. That is, the FDR UE refers to UE capable of receiving the RACH preamble of an adjacent UE that transmits an RACH preamble at the same time when the FDR UE transmits an RACH preamble sequence.

The FDR UE may obtain all of RACH preamble sequences selected by pieces of adjacent UE.

Accordingly, such a method is a method for solving a CPRB collision, wherein pieces of UE select CPRBs in descending order or ascending order of RACH preamble sequence numbers transmitted in order to solve a CPRB collision.

For example, CPRBs have been illustrated as being sequentially allocated in the sequence of RACH preamble sequences. Alternatively, a method of selecting CPRBs combined in various sequences may be applied because UE that has selected a preamble sequence having the smallest value may always have the highest priority.

FIGS. 20A and 20B are diagrams showing an example in which UE to which FDR has been applied selects CPRBs in descending order.

This is described in detail below with reference to FIGS. 20A and 20B. UE 1 selects a preamble sequence #2, UE 2 selects a preamble sequence #4, and UE 3 selects a preamble sequence #8. Each of the pieces of UE may be aware that other pieces of UE have selected which preamble sequences.

Since the preamble sequences are determined in the sequence of the UE 1, the UE 2, and the UE 3, that is, in descending order, CPRBs allocated to the pieces of UE are also allocated in descending order.

In this case, the CPRBs are allocated to only two of the pieces of UE because the number of available CPRBs is 2.

That is, a CPRB #0 corresponding to a low number is allocated to the UE 1. Next, a CPRB #1 is allocated to the UE 2. A CPRB is not allocated to the UE 3 because there is no available CPRB.

Accordingly, the UE 1 and the UE 2 transmit RRC messages to the BS through the selected CPRB #0 and CPRB #1, respectively. The UE 3 abandons the transmission of an RRC message to the BS at a corresponding point of time (i.e., subframe), and transmits the RRC message to the BS using an available CPRB after a back-off time.

In this case, after the back-off time, the CPRB #0 may be allocated to the UE 3 in descending order as in the method of allocating CPRBs to the UE 1 and the UE 2.

If another piece of UE uses a CPRB at a point of time at which the UE 3 uses the CPRB, a CPRB may be allocated to the UE 3 by taking into consideration descending order of preamble sequence numbers in a relation with another piece of UE.

FIG. 21 is a diagram showing an example of a method for minimizing a failure in the transmission of an RRC message through a CPRB by implicitly selecting a CPRB based on a UE identifier (ID) when an RACH procedure is performed using a CP zone.

First, a BS transmits CPRB-related information to UE through system information (S2101).

Thereafter, the UE may select a CPRB according to Equation 2 below based on a UE ID (S2102).

That is, the selection of a CPRB based on a UE ID is performed according to Equation 2.

$$\text{CPRB(\#)selected by UE} = \text{modulo(UE ID \% } N) \quad (2)$$

In Equation 2, N is a total number of CPRBs which may be occupied by UE when an RACH procedure is performed. The N value is system-related information and may be transmitted to the UE through system information (SIB).

The UE ID may be a globally unique UE ID (e.g., an IMSI, GUTI, S-TMSI, or IP address (PDN address)) or may be a UE ID, such as a C-RNTI used to identify UE within a cell. That is, the UE ID may be a UE ID variously used within a cellular network.

Thereafter, the UE transmits UL data to the BS through the selected CPRB (S2103).

Likewise, the method for selecting a CPRB based on a UE ID may be identically to an RACH procedure in which an RACH preamble is not transmitted or a procedure having another object other than the RACH procedure.

Methods using a CP zone with respect to only specific UE or a specific service, which is proposed in this specification, are described in detail below.

The methods described herein may be applied to all of procedures, such as an RACH procedure (based on BS scheduling) and an UL resource allocation procedure (i.e., BSR procedure), but are described in detail below by taking an RACH procedure as example, for convenience of description.

The method using a CP zone with respect to only specific UE or a specific service is for maximizing efficiency of the entire cell resources while satisfying low latency in a wireless communication system, and is performed to optionally use the transmission of UL data based on an UL grant in which a CP zone is not used and the direct transmission of UL data in which a CP zone is used according to circumstances.

A common RACH procedure not using a CP zone is represented as a "4-step RACH procedure" or a "common RACH procedure", and an RACH procedure using a CP zone is represented as a "2-step RACH procedure" or a "CP zone-based RACH procedure."

FIGS. 22A and 22B are diagrams showing examples of a method for allowing a CP zone to be used only in specific UE or a specific service in an RACH procedure, which is proposed by this specification.

Specifically, FIG. 22A shows an RACH procedure in UE or a specific service in which a CP zone cannot be used, and FIG. 22B shows an RACH procedure in UE or a specific service in which a CP zone can be used.

First, a BS configures a CP zone (a contention-based PUSCH zone) for the transmission of the UL data of UE in an UL resource region without an UL grant. In this case, the CP zone may be configured for only the transmission of UL data related to specific UE or a specific service.

Thereafter, the BS transmits control information related to the configured CP zone to the UE (S2201).

In this case, the control information includes procedure determination information allocated according to the type of specific procedure in order to determine (or recognize) the type of specific procedure (or type) performed by the UE.

Specifically, the procedure determination information refers to information by which a BS recognizes whether UE performs a specific procedure (e.g., the CP zone-based RACH procedure or the CP zone-based BSR procedure) using a CP zone or whether UE performs a specific procedure (e.g., the common RACH procedure or the common BSR procedure) without using a CP zone.

The procedure determination information may be a physical random access channel (PRACH) preamble sequence set, including a first PRACH preamble sequence set used for the CP zone-based RACH procedure and a second PRACH preamble sequence set used for the common RACH procedure.

For another example, the procedure determination information may be PRACH preamble resource region information, including a first PRACH preamble resource region used for the CP zone-based RACH procedure and a second PRACH preamble resource region used for the common RACH procedure.

The control information may further include CP zone configuration notification information for providing notification that a specific cell is a cell in which a CP zone has been configured, CP zone resource region information indicative of a resource region that belongs to an UL resource region and to which a CP zone has been allocated, CPRB number information indicative of a total number of CPRBs included in a CP zone, and CPRB-available information indicative of the number of CPRBs/CRPB number which may be used in a CP zone.

The control information may further include indication information indicative of UE capable of using a CP zone, CPRB-UE mapping information indicative of UE allocated for each CPRB, and CP zone use service type information indicative of a service in which a CP zone may be used.

The control information is information related to a system and may be transmitted through a system information block (SIB) or a master information block (MIB), but is not limited thereto. The control information may be transmitted through a different control message or a new control message or may be transmitted to only specific UE in a unicast manner.

Thereafter, the UE checks whether it is UE capable of using a CP zone or whether UL data to be transmitted is data related to a service in which a CP zone may be used based on the received control information.

If, as a result of the check, it is found that the UE is UE capable of using a CP zone or the UL data is data related to a service in which a CP zone may be used, steps of FIG. 22B are performed.

That is, the UE transmits a PRACH preamble sequence which is used for the CP zone-based RACH procedure to the BS (S2212).

Thereafter, the BS recognizes that the type of the RACH procedure performed by the UE is the CP zone-based RACH procedure through the PRACH preamble sequence received from the UE, and receives an RRC and NAS request message from the UE (S2213).

In this case, the RRC and NAS request message is received from the UE through a CP zone.

In response to the RRC and NAS request message, the BS transmits an RRC response message to the UE (S2214).

If, as a result of the check, it is found that the UE is UE incapable of using a CP zone or the UL data is data related to a service in which a CP zone cannot be used, steps of FIG. 22A are performed.

That is, the UE transmits a PRACH preamble sequence which is used for the common RACH procedure to the BS (S2202).

The BS recognizes that the type of procedure performed by the UE is the common RACH procedure through the PRACH preamble sequence received from the UE, and transmits a preamble response to the UE as a response to the received PRACH preamble sequence (S2203).

Thereafter, the UE transmits an RRC and NAS request message to the BS without using a CP zone (S2204).

In response to the RRC and NAS request message, the BS transmits an RRC response message to the UE (S2205).

An example of the contention-based random access procedure has been described above, but the method of FIGS. 22A and 22B may be identically applied to the non-contention-based random access procedure.

Methods Using User-Specific CP Zone

Methods for using a CP zone for specific UE and using a CP zone for a specific service are described in detail below with reference to FIGS. 23 to 25.

FIG. 23 is a diagram showing an example of a method for allowing a CP zone to be used for specific UE, which is proposed by this specification.

Specifically, FIG. 23 shows a method for allocating a CPRB of a CP zone if UE that has entered a cell is UE that requires low latency (e.g., machine-to-machine (M2M) UE).

As shown in FIG. 23, UE and a BS perform an initial access procedure (S2301). The BS may be aware whether the UE is UE that requires low latency through the initial access procedure.

If the BS recognizes that the UE is UE that requires low latency, it allocates a CPRB of a CP zone for the UE so that the UE may transmit UL data through the CP zone.

The BS transmits information related to the allocated CPRB to the UE (S2302).

Thereafter, the UE transmits UL data to the BS through the allocated CPRB (S2303).

In this case, if the UE is UE which periodically transmits small data, it may transmit UL data to the BS through the allocated CPRB periodically or fixedly.

FIG. 24 is a diagram showing another example of a method for allowing a CP zone to be used for specific UE, which is proposed by this specification.

FIG. 24 shows a method for allowing UE to select a CPRB randomly or based on a preamble or based on a UE ID by previously notifying the UE of available CPRBs through system information, as described with reference to FIGS. 17 to 21.

As shown in FIG. 24, a BS transmits information about available CPRBs not yet occupied by UE in its own cell to UE (S2401). In this case, the information about the CPRBs may be transmitted through system information.

That is, the BS transmits information about available CPRBs #0, 3, 5, and 6 to the UE. In this case, CPRBs #1, 2, 4, and 7 have already been allocated to other pieces of UE, and correspond to CPRBs which cannot be used.

If CPRBs allocated to other pieces of UE become available due to the termination of the use of other pieces of UE, the BS may additionally transmit information about the available CPRBs to other pieces of UE.

The UE checks the information about the available CPRBs, selects one (e.g., CPRB #3) of the available CPRBs #0, 3, 5, and 6, and transmits UL data to the BS through the selected CPRB #3.

In this case, the UE transmits a preamble sequence through a PRACH, and transmits an RRC connection request message to the BS through the selected CPRB #3 simultaneously or consecutively with the preamble sequence (S2402).

Thereafter, the BS transmits a message, providing notification of RRC connection setup, to the UE (S2403).

Thereafter, the BS may notify the UE of the information about the available CPRBs #0, 5, and 6 periodically or in an event-driven manner (S2404).

Thereafter, if the UE needs to transmit UL data through a CPRB, it may select one of the available CPRBs and transmit the UL data to the BS through the selected CPRB.

That is, the UE may transmit a BSR to the BS through the available CPRBs #0, 5, and 6 even without separate resource allocation from the BS for the BSR (S2405).

Thereafter, the BS transmits an UL grant for the transmission of the UL data to the UE (S2406).

In this case, a CPRB once occupied by UE may be occupied by the UE consistently or (semi)statically if connectivity with a corresponding cell is present.

Method Using Service-Specific CP Zone

FIG. 25 is a diagram showing an example of a method for allowing a CP zone to be used for a specific service, which is proposed by this specification.

A BS transmits information about a CP zone configured in its own cell and about a CPRB of the CP zone to UE through system information (S2501).

The system information includes CP zone use service type information indicative of a service type in which a CPRB may be used.

The UE checks whether UL data to be transmitted to the BS is related to a service in which a CPRB may be used based on the received system information (S2502).

In this case, when the UE performs initial access through a CPRB of a CP zone upon paging, it also receives the service type of related data while receiving the paging. Accordingly, the UE may be aware whether the UL data to be transmitted is related to a service in which the CPRB of the CP zone may be used.

In this case, the CP zone use service type information may be included in a paging message and transmitted.

If, as a result of the check, it is found that the UL data can be transmitted through the CPRB, the UE transmits the UL data to the BS through the CPRB (S2503).

Likewise, when UE performs a BSR procedure after entering a cell, it may check whether UL data that has generated a BSR is related to a service in which a CPRB of a CP zone can be used, and may transmit the UL data to a BS through the CPRB.

FIG. 26 is a diagram showing an example of the internal block diagrams of a BS and UE proposed by this specification.

As shown in FIG. 26, the BS 2610 and the UE 2620 include communication units (transceiver units or RF units 2613 and 2623), processors 2611 and 2621, and memory 2612 and 2622, respectively.

The eNB and UE may further include respective input units and output units.

The communication unit 2613, 2623, the processor 2611, 2621, the input unit, the output unit, and the memory 2612, 2622 are functionally connected in order to perform the methods proposed in this specification.

When information generated from a physical layer (PHY) protocol is received, the communication unit (transceiver or the RF unit) 2613, 2623 moves the received information to a radio frequency (RF) spectrum, performs filtering and amplification on the information, and sends the processed information to an antenna. Furthermore, the communication unit functions to move an RF signal received from the antenna to a band which may be processed in the PHY protocol and to perform filtering.

Furthermore, the communication unit may include a switch function for switching such a transmission and reception function.

The processor 2611, 2621 implements the functions, processes and/or methods proposed in this specification. The layers of a radio interface protocol may be implemented by the processor.

The processor may be represented as a control unit, a controller, or a computer.

That is, the processor controls the communication unit so that it receives control information related to a contention-based PUSCH zone from a BS, and controls the communication unit so that it transmits UL data to the BS based on the received control information.

The memory 2612, 2622 is connected to the processor and stores a protocol or parameter for performing the transmission of UL data based on a CP zone.

The processor 2611, 2621 may include application-specific integrated circuits (ASIC), other chipsets, logic circuits and/or data processors. The memory may include read-only memory (ROM), random access memory (RAM), flash memory, a memory card, a storage medium and/or other storage devices. The communication unit may include baseband circuits for processing radio signals. When an embodiment is implemented in software, the aforementioned scheme may be implemented using a module (process or function) for performing the aforementioned function.

The module may be stored in the memory and may be executed by the processor. The memory may be placed inside or outside the processor and connected to the processor through various well-known means.

The output unit (or display unit) is controlled by the processor and outputs information output by the processor along with a key entry signal generated by a key input unit and various information signals from the processor.

Furthermore, the drawings have been divided and described for convenience of description, but a new embodiment may be designed so that it is implemented by merging the embodiments described with reference to the drawings. Furthermore, the scope of the present invention also includes designing a computer-readable recording medium in which a program for executing the aforementioned embodiments has been written according to the needs of those skilled in the art.

The methods for transmitting UL data based on a CP zone according to this specification are not limited and applied to the configurations and methods of the aforementioned embodiments, but some or all of the embodiments may be selectively combined and configured so that the embodiments are modified in various ways.

Meanwhile, the method for transmitting UL data based on a CP zone according to this specification may be implemented in a recording medium, readable by a processor included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be distributed over computer systems connected over a network, and the processor-readable code may be stored and executed in a distributed manner.

Furthermore, although some embodiments of this specification have been illustrated and described above, this specification is not limited to the aforementioned specific embodiments, and a person having ordinary skill in the art to which this specification pertains may modify the present invention in various ways without departing from the gist of the claims. Such modified embodiments should not be individually interpreted from the technical spirit or prospect of this specification.

Furthermore, in this specification, both the device invention and the method invention have been described, but the descriptions of both the inventions may be supplemented and applied, if necessary.

INDUSTRIAL APPLICABILITY

This specification is to use the transmission of UL data having low latency.

The invention claimed is:

1. A method for transmitting UL data requiring low latency in a wireless communication system, the method performed by user equipment comprising steps of:
   receiving control information related to a contention-based PUSCH zone from a base station, and
   transmitting UL data to the base station based on the received control information,
   wherein the contention-based PUSCH zone comprises a resource region in which the UL data of the user equipment is able to be transmitted without an UL grant allocated by the base station,
   the control information comprises procedure determination information allocated to each type of specific procedure in order to determine the type of the specific procedure performed by the user equipment, and
   the procedure determination information comprises a PRACH preamble sequence set comprising a first PRACH preamble sequence used for an RACH procedure based on a contention-based PUSCH zone (CP zone) and a second PRACH preamble sequence used for a common RACH procedure not using a CP zone.

2. The method of claim 1, wherein the contention-based PUSCH zone comprises at least one contention PUSCH resource block (CPRB).

3. The method of claim 2, wherein the UL data is transmitted to the base station through the CPRB.

4. The method of claim 1, wherein:
   the UL data comprises a radio resource control (RRC) request message,
   the method further comprises a step of transmitting the first PRACH preamble sequence to the base station,
   the RRC request message and the first PRACH preamble sequence are transmitted simultaneously or consecutively, and
   the RRC request message is transmitted through the contention-based PUSCH zone.

5. The method of claim 1, further comprising a step of receiving a PRACH preamble sequence allocated by the base station, wherein:
   the control information is transmitted through the step of receiving the PRACH preamble sequence allocated by the base station,
   the UL data comprises a radio resource control (RRC) request message, and
   the RRC request message is transmitted through the contention-based PUSCH zone.

6. The method of claim 1, wherein the control information comprises at least one of CP zone resource region information indicative of a resource region which belongs to an UL resource region and to which the CP zone has been allocated and CPRB-related information indicative of information about a total number of CPRBs and available CPRBs within the CP zone.

7. The method of claim 3, wherein the CPRB is selected randomly, based on a PRACH preamble, or based on a user equipment identifier (ID).

8. The method of claim 1, wherein:
   the UL data comprises a buffer status report (BSR) message, and
   the BSR message is transmitted through the contention-based PUSCH zone.

9. The method of claim 8, further comprising a step of transmitting actual data to the base station, wherein the actual data is transmitted through the contention-based PUSCH zone along with the BSR message.

10. The method of claim 4, wherein:
    the control information comprises at least one of CPRB-user equipment mapping information indicative of user equipment mapped to each CPRB and service type information indicative of services in which the CP zone is able to be used, and
    the UL data is transmitted if the user equipment is user equipment capable of using the contention-based PUSCH zone or if the UL data to be transmitted to the base station is related to a service in which the contention-based PUSCH zone is able to be used.

11. The method of claim 1, wherein the control information is transmitted through any one of a system information block (SIB), a master information block (MIB), and a control message.

12. The method of claim 1, further comprising a step of performing an initial access procedure along with the base station, wherein the control information is transmitted by the base station if the user equipment is user equipment requiring low latency through the initial access procedure.

13. User equipment transmitting UL data requiring low latency in a wireless communication system, comprising:
    a communication unit for communicating with an outside in a wired or wireless manner; and
    a processor operatively connected to the communication unit,
    wherein the processor controls the communication unit so that the communication unit receives control information related to a contention-based PUSCH zone from a base station and controls the communication unit so that the communication unit transmits UL data to the base station based on the received control information,
    the contention-based PUSCH zone comprises a resource region in which the UL data of the user equipment is able to be transmitted without an UL grant allocated by the base station,
    the control information comprises procedure determination information allocated to each type of specific procedure in order to determine the type of the specific procedure performed by the user equipment, and
    the procedure determination information comprises a PRACH preamble sequence set comprising a first PRACH preamble sequence used for an RACH procedure based on a contention-based PUSCH zone (CP zone) and a second PRACH preamble sequence used for a common RACH procedure not using a CP zone.

14. The method of claim 8, wherein:
    the control information comprises at least one of CPRB-user equipment mapping information indicative of user equipment mapped to each CPRB and service type information indicative of services in which the CP zone is able to be used, and
    the UL data is transmitted if the user equipment is user equipment capable of using the contention-based PUSCH zone or if the UL data to be transmitted to the base station is related to a service in which the contention-based PUSCH zone is able to be used.

* * * * *